(12) United States Patent  
Chapman et al.

(10) Patent No.: US 10,135,490 B2
(45) Date of Patent: Nov. 20, 2018

(54) INTERFERENCE GROUP DISCOVERY FOR FULL DUPLEX NETWORK ARCHITECTURE IN CABLE NETWORK ENVIRONMENT

(71) Applicant: CISCO TECHNOLOGY, INC., San Jose, CA (US)

(72) Inventors: John T. Chapman, Coto de Caza, CA (US); Hang Jin, Plano, TX (US); Tong Liu, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/483,234

(22) Filed: Apr. 10, 2017

(65) Prior Publication Data

US 2018/0294837 A1 Oct. 11, 2018

(51) Int. Cl.
*H04B 3/46* (2015.01)
*H04B 17/345* (2015.01)
(Continued)

(52) U.S. Cl.
CPC .............. *H04B 3/46* (2013.01); *H04B 17/345* (2015.01); *H04L 12/2885* (2013.01); *H04L 5/14* (2013.01)

(58) Field of Classification Search
CPC ........ H04B 3/487; H04B 3/46; H04B 17/345; H04B 3/32; H04B 17/24; H04B 15/00;
(Continued)

(56) References Cited

U.S. PATENT DOCUMENTS 6,912,209 B1   6/2005 Thi et al.
7,246,368 B1 * 7/2007 Millet ................. H04L 43/50
                                                    370/241
(Continued)

FOREIGN PATENT DOCUMENTS

WO   2017011143 A1   1/2017
WO   2018050064 A1   3/2018

OTHER PUBLICATIONS

European Extended Search Report dated Dec. 8, 2017 cited in Application No. 17183153.0, 9 pgs.
(Continued)

*Primary Examiner* — Khanh C Tran
(74) *Attorney, Agent, or Firm* — Merchant & Gould P.C.

(57) ABSTRACT

An example apparatus comprises a processor, and a memory element in communication with the processor. The processor configured to send a first message to at least a first cable modem of a plurality of cable modems. The first message indicates an upstream test signal to be generated by the first cable modem within a predetermined portion of a frequency spectrum allocated for downstream communication. The processor is further configured to send a second message to at least a second cable modem of the plurality of cable modems. The second message indicates a downstream interference measurement to be performed on the upstream test signal by the second cable modem. The processor is further configured to receive at least one interference measurement result indicative of the downstream interference measurement, and determine at least one interference group for the plurality of cable modems based upon the at least one interference measurement result.

23 Claims, 22 Drawing Sheets

(51) Int. Cl.
*H04L 12/28* (2006.01)
*H04L 5/14* (2006.01)

(58) Field of Classification Search
CPC ....... H04L 43/50; H04L 12/2885; H04L 5/14; H04L 5/00; H04L 12/18
See application file for complete search history.

(56) References Cited

U.S. PATENT DOCUMENTS

| | | |
|---|---|---|
| 7,856,049 B2 | 12/2010 | Currivan et al. |
| 8,457,584 B2 | 6/2013 | Currivan |
| 8,565,266 B1 | 10/2013 | Fox et al. |
| 8,594,118 B2 | 11/2013 | Cooper et al. |
| 9,031,409 B2 | 5/2015 | Nandiraju et al. |
| 8,937,992 B2 | 6/2015 | Cooper et al. |
| 9,136,943 B2 | 9/2015 | Thompson et al. |
| 9,160,463 B2 | 10/2015 | Hunter |
| 2007/0047631 A1* | 3/2007 | Bostoen ................. H04B 3/487 375/222 |
| 2017/0093555 A1 | 3/2017 | Hamzeh et al. |
| 2018/0076910 A1* | 3/2018 | Zhang ................... H04B 17/24 |

OTHER PUBLICATIONS

European Examination Report dated Aug. 3, 2018 issued in Application No. EP 17183153.0, 6 pgs.

\* cited by examiner

INTERFERENCE GROUP DISCOVERY FOR FULL DUPLEX NETWORK ARCHITECTURE IN CABLE NETWORK ENVIRONMENT

TECHNICAL FIELD

This disclosure relates in general to the field of communications and, more particularly, to interference group discovery for full duplex network architecture in cable network environment.

BACKGROUND

Consumer appetite for bandwidth continues to grow exponentially in the cable network market. In some cable network architectures, including remote physical layer (RPHY) with digital fiber, the coax cable becomes the bottleneck in throughput, stifling increase in bandwidth. The typical multi-system operator (MSO) is out of options currently, due to the inherent technological limitations of existing cable network components. For example, the Shannon channel capacity limit (e.g., tight upper bound on rate at which information can be reliably transmitted over a communications channel) has practically been achieved already in existing cable network architectures. There is consumer driven demand to extend the frequency spectrum beyond 1.2 GHz, but a conventional extension would require extensive network upgrade. Upgrades in network components are limited by capital expenditure (CAPEX) budget limitations. All optics (fiber to the home (FTTH) have excessive CAPEX. In such scenarios, it may be desirable to offer new services with full downstream/upstream (DS/US) throughput (e.g., matching Gigabit-capable Passive Optical Networks (GPON) standard of 2.5 Gbits downstream/1 Gbits upstream ratio) with limited capital expenditure for outside plant upgrade.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example apparatus in a cable network includes a processor, and a memory element in communication with the processor. The processor configured to send a first message to at least a first cable modem of a plurality of cable modems. The first message indicates an upstream test signal to be generated by the first cable modem within a predetermined portion of a frequency spectrum allocated for downstream communication. The processor is further configured to send a second message to at least a second cable modem of the plurality of cable modems. The second message indicates a downstream interference measurement to be performed on the upstream test signal by the second cable modem. The processor is further configured to receive at least one interference measurement result indicative of the downstream interference measurement, and determine at least one interference group for the plurality of cable modems based upon the at least one interference measurement result.

Example Embodiments

Figure 1A:
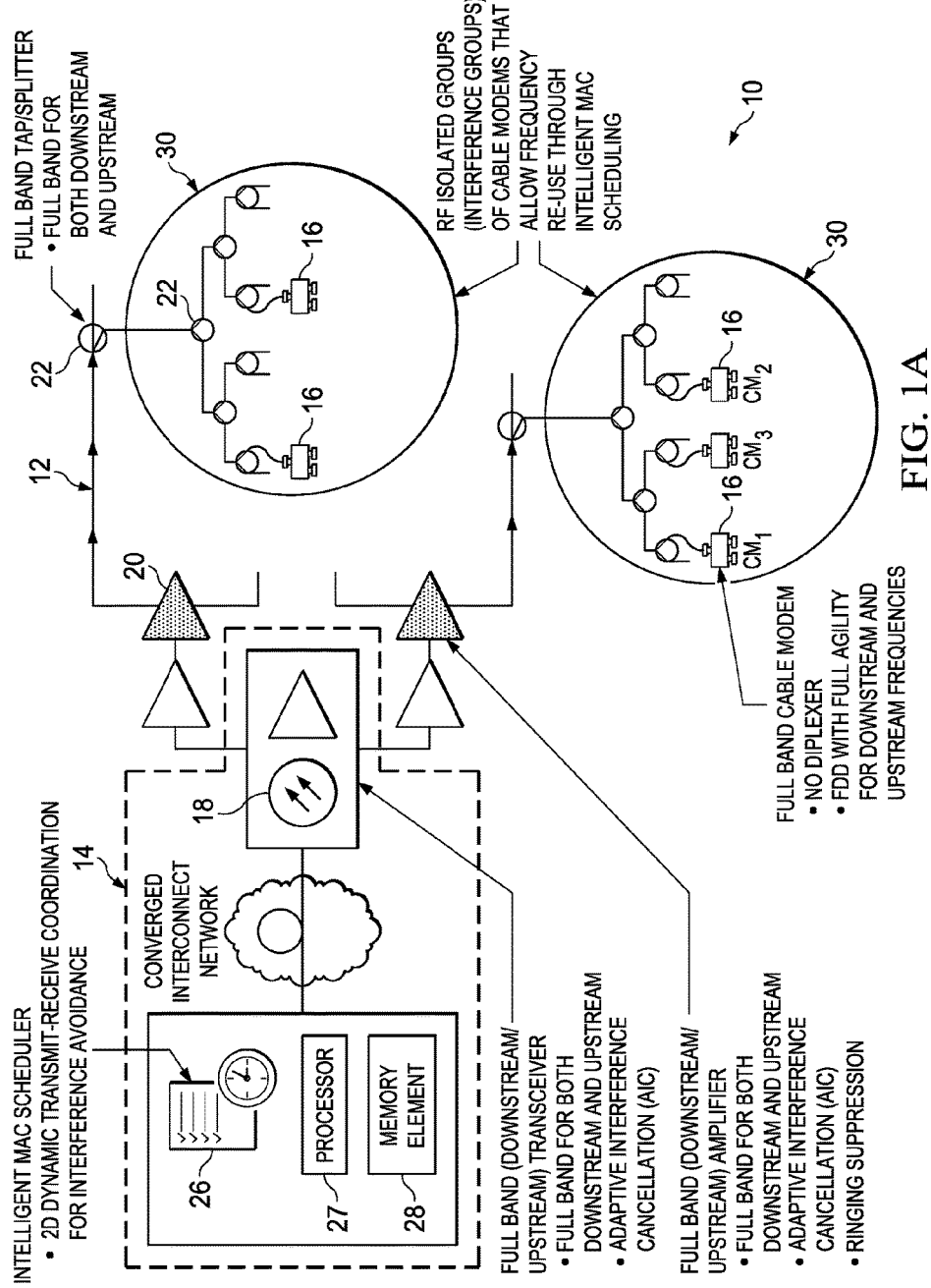
FIG. 1A is a simplified block diagram illustrating a communication system comprising a full duplex network architecture in cable network environments.

Turning to FIG. 1A, FIG. 1A is a simplified block diagram illustrating a communication system 10 enabling full duplex network communication in cable network environments in accordance with one example embodiment. FIG. 1 illustrates a cable network 12 (indicated generally by an arrow) facilitating full duplex communication between a cable modem termination system (CMTS) 14 and one or more cable modems (CMs) 16. Network 12 includes transceivers 18, amplifiers 20, and taps and splitters 22. CMTS 14 includes an intelligent media access control (MAC) scheduler 26 that enables a two-dimensional transmission-reception (T-R) coordination for interference avoidance, along with a processor 27 and a memory element 28 that facilitate executing instructions comprised in MAC scheduler 26. In various embodiments, cable modems 16 may be grouped into various interference groups 30 to enable full duplex communication with little to no interference. Groups 30 may comprise radio frequency (RF) isolated groups that allow frequency re-use through intelligent MAC scheduling.

Transceivers 18 enable full band communication for both upstream and downstream network traffic and implement dynamic interference cancellation, also referred to herein as adaptive interference cancellation (AIC). Note that as used herein, the term "upstream" refers to a communication direction from cable modems 16 towards CMTS 14; the term "downstream" refers to a communication direction from CMTS 14 towards cable modems 16. Amplifiers 20 enable full band communication for both upstream and downstream network traffic, and implement AIC with ringing (e.g., echo) suppression. Taps and splitters 22 may enable full band communication for downstream and upstream traffic.

Each of cable modems 16 supports full band communication, but operates in simplex mode for upstream or downstream transmission. For example, each of cable modems 16 may be assigned non-overlapping frequency bands for upstream and downstream communication, yet the same set of carriers can be used for the downstream and upstream communication, yielding a doubling of throughput compared to currently existing non-full duplex systems. Communication system 10 can enable higher bandwidth (e.g., bandwidth is the maximum amount of data that can travel through a communication channel) and throughput (e.g., throughput refers to the quantity of data that actually does travel through the communication channel successfully) through full-duplex communication.

To explain generally, bandwidth limitations are solved in some communication networks through duplex communication. In a general sense, duplex communication is bidirectional, allowing both end nodes of a communication channel to send and receive data simultaneously. Both end nodes have the ability to operate as sender and receiver at the same time, or take turns sending or receiving data. Duplex-based systems typically have dual communication channels that provide separate medium (e.g., paths) for upstream (US) (e.g., uplink, outgoing, transmitting) and downstream (DS) (e.g., downlink, incoming, receiving) communication. In full duplex mode, the node sends and receives signals simultaneously on the same frequency range.

Examples of communication techniques include frequency division duplexing (FDD) and time division duplexing (TDD). In FDD, separate frequency bands (e.g., carrier frequencies) are used at the transmitter and receiver. Because FDD uses different frequency bands for upstream and downstream operations, the upstream and downstream communication do not interfere with each other. Examples of FDD systems include the following: asymmetric digital subscriber line (ADSL) and very-high-bitrate digital subscriber line (VDSL); cellular systems, including UMTS/WCDMA Frequency Division Duplexing mode and the CDMA2000 system; IEEE 802.16 WiMax Frequency Division Duplexing mode.

In TDD, the upstream communication is separated from the downstream communication by allocation of different time slots in the same frequency range. For example, users, such as cable modems, are allocated time slots for upstream transmission and downstream reception. TDD allows asymmetric flow for upstream and downstream data transmission. TDD is advantageous in cases where upstream and downstream data rates are asymmetric. The capacities of downstream communication links and upstream communication links are altered in favor of one direction over another by providing greater time allocation through time slots to downstream reception intervals than to upstream transmission intervals.

Full duplex communication mechanisms that are not FDD or TDD have not been used in cable networks, because the inherent network architecture and communication protocols do not support such communication mechanisms. For example, cable was first introduced in the United States in the late 1950s. For the next 30 years, nearly every mile of buried cable was half duplex; thus, the network was capable of broadband transmission in the downstream direction, from the head end to the subscriber, but not in the upstream direction—communication from the subscriber back to the head end was possible only via a telephone line. In recent years, cable operators have been investing heavily to upgrade their buried cables from half to full duplex as a necessary first step to capitalize on the demand for integrated data and voice services. However, upstream transmissions continue to be slower than downstream receptions (typically 1.5 to 3 Mbps downstream and 500 Kbps to 2.5 Mbps upstream).

Nevertheless, with a properly configured cable network architecture, such as cable network 12 of communication system 10, full duplex communication can drastically expand available upstream spectrum (e.g., estimated 5 to 10 times upstream capacity increase). Full duplex communication can provide near symmetric downstream and upstream throughput. System capacities (e.g., bandwidth) can improve with full duplex communication. Moreover, full duplex communication may be technology-agnostic and/or standards/agnostic.

However, implementing full duplex in existing cable networks meet with certain challenges. For example, a large transmitted signal coupled back to the receiver due to reflection (e.g., self-interference from the transmit pathway into the receive pathway within one and same transceiver) at any of the network components, including CMTS 14, cable modems 16, transceivers 18, amplifiers 20 and taps and splitters 22 can kill the received signal at the receiver. Moreover, upstream transmit signal from one of cable modems 16 may leak into the downstream pathway of another of cable modems 16, causing interference. Unlike self-interference, such inter-CM interference cannot be removed with mere echo cancellation techniques because the upstream transmit signal is unknown in the downstream pathway.

Embodiments of communication system 10 can resolve such issues by enabling full duplex communication using appropriately configured components and spectrum sharing techniques. Full duplex communication can be successfully implemented by suppressing (e.g., eliminating) transmitted signals that are coupled back to the receiver (e.g., as an echo, as an upstream signal leaking into the downstream pathway and vice versa, etc.). Sufficient transmitted signal cancellation and/or elimination can be achieved by leveraging (among other parameters) state of art devices and digital signal processing technologies, high speed and high performance (e.g., high resolution) analog to digital converters (ADC), powerful devices with more signal processing capability, an AIC scheme, and advanced MAC scheduling for spectrum sharing. In various embodiments, the AIC scheme suppresses at a receiver (of transceiver 18 or amplifier 20 appropriately) a signal transmitted by a transmitter (of transceiver 18 or amplifier 20 appropriately). Further, in addition to the AIC scheme, full band amplifier 20 implements a ringing suppression scheme implementing echo cancellation.

According to embodiments of communication system 10, MAC scheduler 26 implements a two-dimensional transmission-reception (T-R) coordination scheme among cable modems 16 in cable network 12. According to the T-R coordination scheme, cable modems 16 are categorized into interference groups 30, such that no cable modem of any one interference group transmits upstream in a frequency range simultaneously as another cable modem in the same interference group receives downstream in the frequency range, facilitating full duplex communication in cable network 12 across the frequency range. Cable modems 16 operate in simplex mode, while supporting full band operation for downstream reception and upstream transmission. Note that cable modems 16 in different interference groups 30 transmit upstream and receive downstream simultaneously in the frequency range. In various embodiments, CMTS 14 receives and transmits network traffic across the entire frequency range, facilitating full duplex communication in cable network 12. In some embodiments, cable modems 16 are classified into interference groups 30 through a ranging process.

In some embodiments, MAC scheduler 26 implements the T-R coordination centrally in cable network 12. To explain in further detail, the available frequency spectrum of communication system 10 is divided into frequency resource blocks, comprising a band of adjacent frequencies (e.g., contiguous sub-carriers). OFDM symbols in time space are grouped into the resource blocks in frequency space. According to the centrally implemented T-R coordination scheme, MAC scheduler 26 partitions resource blocks available to any one interference group into at least a first portion and a second portion; the first portion is reserved for upstream transmission, and the second portion is reserved for downstream reception, such that the first portion and the second portion do not overlap in time and frequency for any cable modem in the interference group.

In various embodiments, a cable network operator may upgrade an existing cable network operating in simplex mode to a full duplex mode by adding appropriate components supporting full duplex communication. For example, the cable network operator may implement a method for full duplex communication in cable network 12 by operating MAC scheduler 26 implementing the above-described two-dimensional T-R coordination scheme among cable modems 16, operating full band transceiver 18 implementing the AIC scheme, and operating full band amplifier 20 implementing the AIC scheme and the ringing suppression scheme implementing echo cancellation. The cable network operator may add to cable network 12 one or more taps and splitters 22 that support full band communication in cable network 12.

Figure 1B:
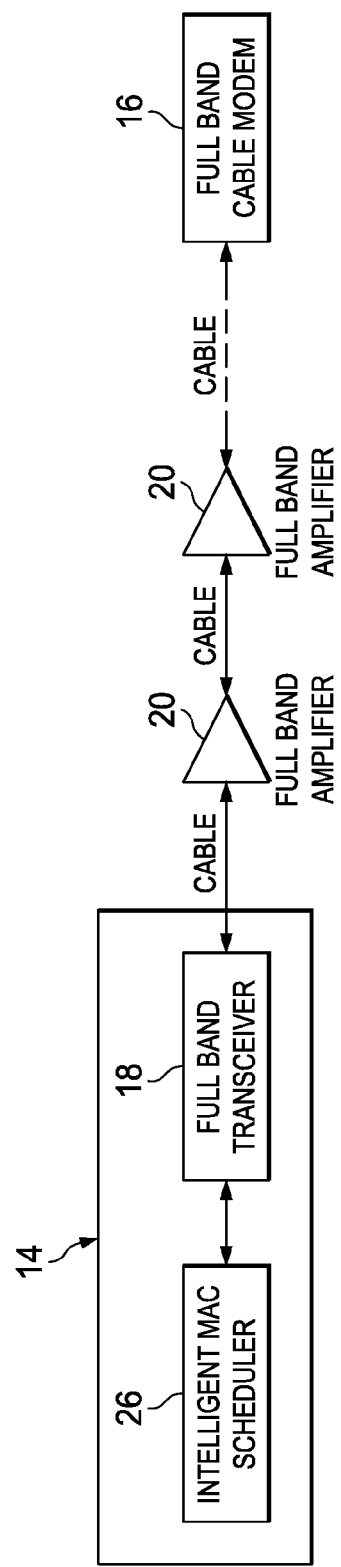
FIG. 1B is a simplified block diagram illustrating example details of embodiments of the communication system.

Moreover, capital expenditure for upgrading to full duplex communication may be reduced by reusing certain components. Turning to FIG. 1B, FIG. 1B shows a simplified diagram illustrating network components of network 12 that may be replaced or added in existing cable networks to enable full duplex communication. Note that in some embodiments, such as N+m architecture with m=0 (e.g., N stands for number of nodes, m stands for number of amplifiers after each node), amplifiers 20 are not used at all. In an example embodiment, a majority (e.g., 97%) of taps and splitters 22 can be re-used for full duplex operation. This may be because standard tap and splitter combiner can operate in full band (e.g., 5-1000 MHz) for both upstream and downstream, supporting full-duplex communication in the supported frequency band. Only a minority (e.g., 3%) of taps and splitters 22 that do not support full band downstream and upstream may have to be replaced for full duplex communication. Likewise, because cable modems 16 are not operating in full duplex mode singly, they may be reused if they support the full band (e.g., they include capability to perform FDD with full agility for upstream and downstream frequencies). Components in network 12 that include diplexers (such as transceivers 18 and amplifiers 20) may have to be replaced entirely to support full duplex communication.

In various embodiments, intelligent MAC scheduling may be used to avoid interference among neighboring cable modems 16. Intelligent MAC scheduling can include: (i) IG Discovery (e.g., measuring and/or monitoring interference among cable modems 16, for example, by establishing interference groups 30), and (ii) T-R coordination (e.g., transmissions and receptions are coordinated through a centric or distributed scheduler to avoid interference among cable modems 16). In some embodiments, the T-R coordination implements a two dimensional (frequency and time) interference avoidance scheme.

IG Discovery facilitates assigning cable modems 16 to one or more interference groups 30. In some embodiments, during IG Discovery, each of cable modems 16 transmits an interference pattern upstream. For example, the interference pattern could comprise a single tone at one or more frequencies. Other cable modems 16 attempt to receive the interference pattern on their downstream reception frequencies. Different frequencies and/or marked tones for the interference pattern may facilitate many cable modems 16 using the same IG Discovery frequency interval. In some cases, one cable modem may interfere with another, which interferes with a third cable modem, yet the third cable modem may not interfere with the first cable modem. For example, there may be cases in which $CM_1$ interferes with $CM_2$, which interferes with $CM_3$, but $CM_3$ does not interfere with $CM_1$, leading to overlapping interference groups 30. In one example embodiment, such overlapping groups may be lumped into one overarching group, with sub-groups therein.

In some embodiments, one of cable modems 16 may be scheduled to transmit on a specific frequency in a maintenance time window, and other cable modems 16 report their downstream modulation error ratio (MER) or interference level on that frequency to MAC scheduler 26 (or CMTS 14, or other appropriate report receiving module in cable network 12). Based on the reported downstream MER or interference level (as the case may be), a determination may be made as to which cable modems 16 are interfered by the transmitting one of cable modems 16. The interfered cable modems 16 are associated with the transmitting one of cable modems 16 on that frequency in a particular one of interference groups 30. The process may be repeated for various frequencies and cable modems 16. Interference groups 30 may not be updated often. Updating interference groups 30 comprises informing cable modems 16 categorized in respective interference groups 30 as to their membership. Membership of cable modems 16 may change due to various environmental conditions, the transmit power used by particular CMs, and other factors. In some embodiments, interference groups 30 may be updated when there are changes to Hybrid fiber-coaxial (HFC); in other embodiments, interference groups 30 may be updated after a predetermined time interval (e.g., 24 hours).

In some embodiments, intelligent MAC scheduler 26 implements static frequency planning for T-R coordination. Spectrum sharing may be implemented through dynamic transmission coordination to avoid interferences. To explain interferences, consider upstream transmission from $CM_1$. The upstream transmission from $CM_1$ may be coupled into $CM_2$ at a common tap-splitter 22 with limited isolation and cause interference with downstream reception at $CM_2$. The interference from $CM_1$ cannot be cancelled out at $CM_2$ as $CM_2$ does not have any reference signal from $CM_1$ (e.g., $CM_2$ cannot determine whether downstream reception at $CM_2$ is from CMTS 14 or from $CM_1$).

To reduce interferences at cable modems 16, a CM frequency planning scheme is implemented in various embodiments. The frequency spectrum used in cable network 12 is divided into multiple frequency ranges that align with channel boundaries. For each one of cable modems 16 and each frequency range, those cable modems 16 are identified whose upstream transmissions interfere with downstream reception of that specific one of cable modems 16, and those cable modems 16 whose downstream receptions are interfered by upstream transmissions of that specific one of cable modems 16, if they operate on that same frequency (as is the case in full duplex communication). MAC scheduler 26 avoids assigning cable modems 16 to frequency ranges that cause interferences among them.

Full duplex communication affects operation of various components of cable network 12, and the implications are different on different components. For example, the implications on CMTS 14 arise in the two areas: (a) full duplex involves CMTS 14 supporting throughputs of full band downstream traffic and upstream traffic (this is mainly a capacity specification to support the throughput); and (b) frequency planning and intelligent MAC scheduling, including establishing interfering/interfered lists according to algorithms described herein, executing frequency planning algorithms and determining frequency assignments, and T-R coordination as appropriate. In some embodiments, such functions can be integrated into MAC scheduler 26 at CMTS 14.

In some embodiments, full duplex communication may involve a major re-design of transceiver 18. Transceiver 18 may be reconfigured by replacing its diplexer with a 2-way combiner-splitter and other modifications. Transceiver 18 may be rewired to support full band operation for both downstream and upstream, and for high capacity to support the throughput of full band downstream and upstream. Transceiver 18 may also be changed to implement AIC algorithms. Other functions to support full duplex include: measuring interferences among cable modems 16 for frequency planning; and measuring cable modem downstream timing and upstream timing for supporting T-R coordination as appropriate.

Although cable modems 16 operate in FDD mode (e.g., downstream reception and upstream transmission on different frequencies in any one cable modem), cable modems 16 support full band FDD operation of both downstream and upstream. Full band FDD means downstream and upstream frequencies can be on any frequencies between 10 MHz to 1000 MHz (1.2 GHz) although they do not overlap each other. This means that cable modems 16 do not include any diplexer. In addition, cable modems 16 have full frequency agility, good RF fidelity (e.g., with minimized guard band between downstream and upstream), and high capacity to support full band throughput (e.g., 500 MHz DS and 500 MHz US).

Amplifier 20 may be subject to a major re-design to support full duplex communication. For example, amplifier 20 may be re-designed with no diplexer, full band operation, and digitized input signal. Interference cancellation blocks including ringing suppression may be added to existing amplification functions. Amplifier 20 implementing a two-step interference cancellation scheme can provide over 50 dB interference suppression and push the interference below the noise floor. However, some signal integrity degradation may be inevitable. For example, if the interference is suppressed to 6 dB below the system noise floor, there may be 1 dB degradation to signal's ratio of signal-to-noise ratio (SNR) to modulation error ratio (MER) (SNR/MER). In some embodiments, the maximum number of the cascaded amplifiers (including trunk, bridge and extender) may be limited to 5 (N+5, max 5 dB degradation at the end of the line), for example, to minimize signal degradation.

The optical link in HFC may be changed to support full duplex operation by providing high capacity for both DS and US to support the high throughput of coaxial network under full duplex. In a general sense, amplifiers in the coax network may be replaced. Devices with built-in diplexer (for example, reverse attenuator) in the coax network may be replaced (3% of taps, according to Cisco CATV market). System gain re-engineering/re-balance may be suitable due to the extended frequencies. Some of the devices may be replaced (with better port-to-port isolation) to enhance isolation among cable modems 16. Occasionally, the coax network may be re-architected to enhance isolation among cable modems 16. For example, an amplifier may be added right before a splitter to create isolated cable modem groups.

Full duplex could significantly increase cable access upstream throughput. An enabler for full duplex is interference cancellation and avoidance. Simulation results show that interference cancellation can be achieved through advanced digital signal processing algorithms. Full duplex is perpendicular to (e.g., orthogonal to, independent of, etc.) cable access technologies and high layer architectures; thus, it can work with any high level protocols and architectures. Full duplex can be used with existing access technology (CABU R-PHY shelf/node and CDBU CM), or as a candidate for next generation DOCSIS access technology. Full duplex is novel and substantial, and has business and technology impacts that may go beyond cable access (wireless, for example).

Turning to the infrastructure of communication system 10, the network topology can include any number of cable modems, customer premises equipment, servers, switches (including distributed virtual switches), routers, amplifiers, taps, splitters, combiners and other nodes inter-connected to form a large and complex network. Network 12 represents a series of points or nodes of interconnected communication pathways for receiving and transmitting packets and/or frames of information that are delivered to communication system 10. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Cable network 12 offers a communicative interface between cable network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 12 may implement any suitable communication protocol for transmitting and receiving data packets within communication system 10. The architecture of the present disclosure may include a configuration capable of DOCSIS, TCP/IP, TDMA, and/or other communications for the electronic transmission or reception of signals in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In particular embodiments, CMTS 14 may comprise a hardware appliance with appropriate ports, processors, memory elements, interfaces, and other electrical and electronic components that facilitate the functions described herein, including providing high speed data services, such as cable Internet or voice over Internet Protocol (e.g., in the form of digital, RF, or other suitable signals) to cable subscribers, such as cable modems 16. In various embodiments, CMTS 14 comprises a Universal Broadband Router (uBR) with features that enable it to communicate with a Hybrid Fiber Coaxial (HFC) cable network via a suitable cable modem card, which provides an interface between the uBR protocol control information (PCI) bus and radio frequency (RF) signals on the DOCSIS HFC cable network.

In some embodiments, CMTS 14 may comprise a converged cable access platform (CCAP) core that transmits and receives digital signals in IP protocols, coupled with one or more physical interface (PHY) transceiver(s), such as transceiver 18 that convert the digital IP signals into RF signals, and vice versa. The PHY transceivers, such as transceiver 18, may be co-located with the CCAP core at a common location, or may be located remote from the CCAP core and connected over a converged interconnect network (CIN). In some embodiments, CMTS 14 may comprise a single CCAP core and a plurality of PHY transceivers, such as transceiver 18. CMTS 14 is connected (e.g., communicatively coupled, for example, through wired or wireless communication channels) to cable modems 16, transceiver 18, and amplifier 20 in cable network 12.

In some embodiments, intelligent MAC scheduler 26 may comprise a hardware device or software application or combination thereof executing within CMTS 14 to facilitate spectrum sharing by cable modems 16. In other embodiments, intelligent MAC scheduler 26 may comprise a hardware device or software application executing outside CMTS 14, for example, in a separate appliance (e.g., fiber coaxial unit (FCU) access node, etc.), server, or other network element and coupled to (e.g., connected to, in communication with, etc.) CMTS 14 in cable network 12.

Transceivers 18 may comprise suitable hardware components and interfaces for facilitating the operations described herein. In some embodiments, transceivers 18 may be embedded in or be part of another hardware component, such as a broadband processing engine comprising a motherboard, microprocessors and other hardware components. In some embodiments, transceivers 18 comprise downstream and upstream PHY modules, deployed in a Coaxial Media Converter (CMC) that supports RF functions at the PHY layer. Transceivers 18 may comprise pluggable modules (e.g., small form-factor pluggable (SFP)) that may be plugged into a network element chassis, or embedded modules that attach to cables directly. In addition to optical and electrical interfaces, transceivers 18 include a PHY chip, appropriate digital signal processors (DSPs) and application specific integrated circuits (ASICs) according to particular needs. In various embodiments, the DSPs in transceivers 18 may be adapted (e.g., programmed) to perform appropriate interference cancellation as described herein to enable full duplex communication.

Amplifiers 20 comprise RF amplifiers suitable for use in cable network 12. Amplifiers 20 are typically used at intervals in network 12 to overcome cable attenuation and passive losses of electrical signals caused by various factors (e.g., splitting or tapping the coaxial cable). Amplifiers 20 may include trunk amplifiers, distribution amplifiers, line extenders, house amplifier and any other suitable type of amplifier used in cable networks. According to various embodiments, substantially all amplifiers 20 are configured suitably as described herein to facilitate full duplex communication.

Figure 2:
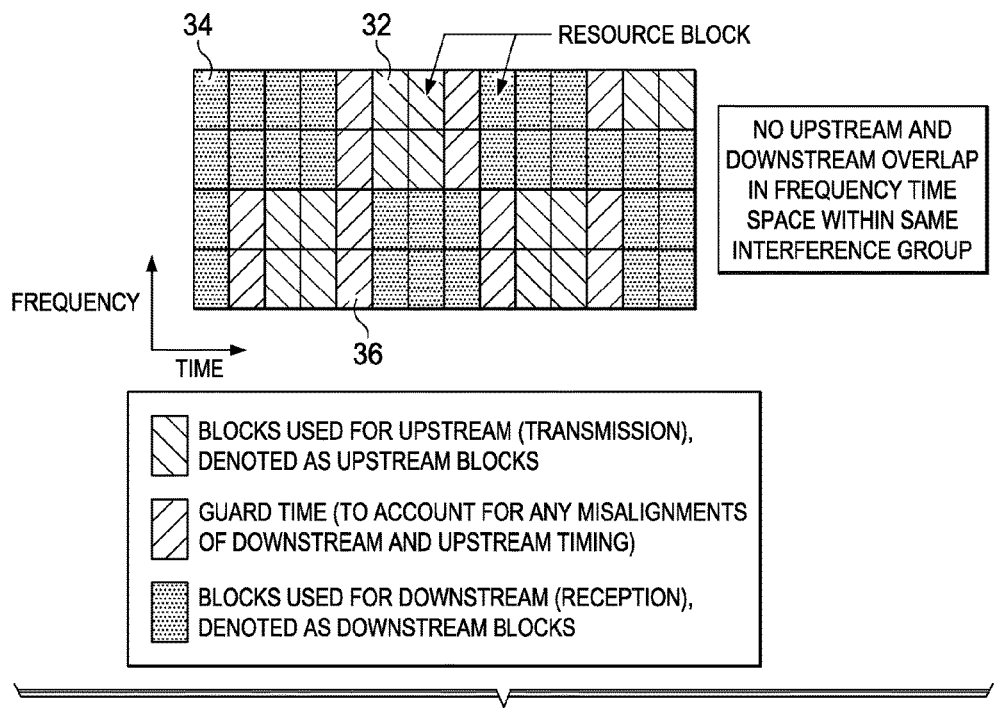
FIG. 2 is a simplified block diagram illustrating other example details of embodiments of the communication system.

Turning to FIG. 2, FIG. 2 is a simplified diagram illustrating example details of frequency planning by MAC scheduler 26 according to an example embodiment of communication system 10. Various frequency ranges used by cable modems 16 in any one of interference groups 30 may be divided in time into resource blocks, such as upstream resource blocks 32, downstream resource blocks 34 and guard time resource blocks 36. In a general sense, the time and frequency employed to transmit an amount of data may be grouped as a resource block. In some embodiments, each resource block may comprise 8 or 16 symbols in time, and 1 subcarrier in frequency. The frequency division aligns with channel boundaries in some embodiments. In other embodiments, the frequency division has finer granularities, such as corresponding to groups of subcarriers for DOCSIS 3.1. The time division aligns with frame boundaries in some embodiments. In other embodiments, the time division aligns with mini-slots boundaries. In various embodiments, upstream resource blocks 32 and downstream resource blocks 34 in the relevant interference group do not synchronize on the time division boundaries; there is no overlap between upstream transmission and downstream receptions in frequency-time space within the same interference group.

In some embodiments, a centric scheduler algorithm may be used to achieve T-R coordination with the described resource allocation scheme. Other embodiments use a distributed scheduler algorithm for T-R coordination. With the centric scheduler algorithm, the resource scheduling in time and frequency is done centrally, for example, with MAC scheduler 26 in CMTS 14. In the distributed scheduler algorithm, the upstream scheduling is done mainly by cable modems 16 through a contention scheme. CMTS 14 assists the upstream scheduling by policing resource usage by cable modems 16 to avoid the collision. In other words, it is a contention based upstream scheduling with collision avoidance. The distributed scheduler algorithm is similar in some ways to the centric scheduler algorithm, in that the distributed algorithm divides the available bandwidth into resource blocks, and follows the rule of no overlapping of downstream resource blocks 34 and upstream resource blocks 32 within any one of interference groups 30.

A simplex bi-directional signaling channel is established between CMTS 14 and cable modems 16 to exchange scheduling information. CMTS 14 broadcasts the downstream resource block allocation information comprising a downstream media access protocol (MAP) message to cable modems 16 in the signaling channel ahead of the actual allocation time. Cable modems 16 listen to the downstream MAP in the signaling channel. Based on the downstream MAP, cable modems 16 sort out upstream resource blocks 32 available for upstream transmission. In various embodiments, a specific downstream MAP message may be applicable to (e.g., correspond with) a particular one of interference groups 30. Based on queue depth (e.g., amount of data queued to be transmitted), cable modems 16 reserve upstream resource blocks 32 by sending a reservation notice to CMTS 14. CMTS 14 echoes the cable modems' reservations in a downstream signaling channel with time stamps. Each of cable modems 16 receives an echo of its own reservation and reservation of other cable modems 16, with time stamps. The specific one of cable modems 16 with the earliest time stamp for its reservation may seize upstream resource blocks 32 and start transmitting.

The downstream and upstream scheduling are not independent of each other. For a specific one of cable modems 16, MAC scheduler 26 may schedule its upstream transmission in certain upstream resource blocks 32; further, MAC scheduler 26 may ensure that other cable modems 16 from the same interference group receive their downstream receptions in downstream resource blocks 34 that do not overlap with scheduled upstream resource blocks 32 of the specific one of cable modems 16. Likewise, for the specific one of cable modems 16, MAC scheduler 26 may schedule its downstream reception in certain downstream resource blocks 34; further, MAC scheduler 26 may ensure that other cable modems 16 from the same interference group transmit upstream in upstream resource blocks 32 that do not overlap with the scheduled downstream resource blocks 34. Multicast and broadcast messages may be scheduled on specific resource blocks without upstream transmission from any cable modems 16. In the case of broadcast video, a block of downstream spectrum (e.g., frequency range) may be allocated for broadcast video, and the corresponding upstream spectrum may be idled to avoid interference to video at cable modems 16.

Figure 3:
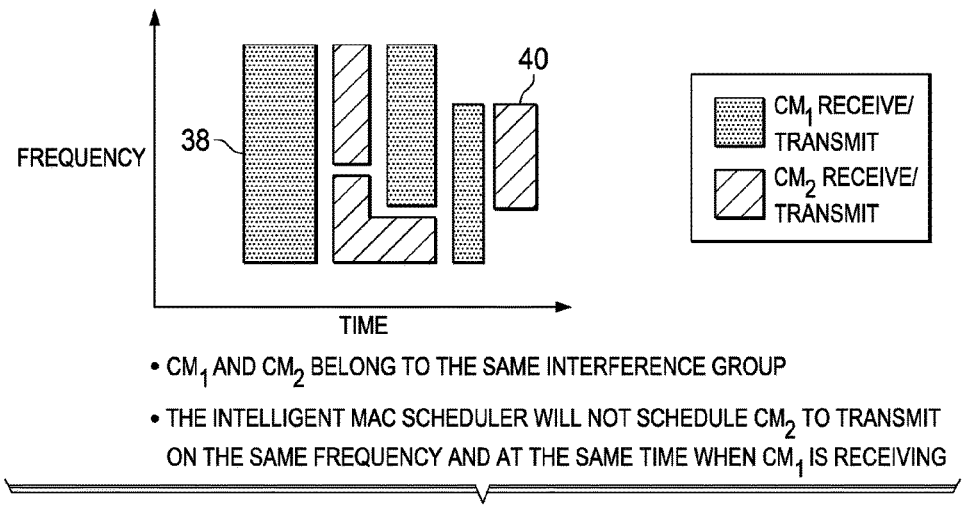
FIG. 3 is a simplified block diagram illustrating yet other example details of embodiments of the communication system.

Turning to 4, FIG. 3 is a simplified diagram illustrating example details of T-R coordination according to an embodiment of communication system 10. Consider T-R coordination among two CMs, $CM_1$ and $CM_2$ in a particular one of interference groups 30 in cable network 12. MAC scheduler 26 may allocate resource blocks 38 to $CM_1$ and resource blocks 40 to $CM_2$. Note that for ease of illustration, upstream resource blocks and downstream resource blocks comprised in resource blocks 38 and 40 are not explicitly shown. MAC scheduler 26 will not schedule $CM_2$ to transmit upstream on the same frequency at the same time when $CM_1$ is receiving downstream. In other words, $CM_1$ and $CM_2$ do not have overlapping resource blocks for upstream transmission or downstream reception. Such pairwise relationship holds for any pair of cable modems 16 in any one of interference groups 30.

Figure 4:
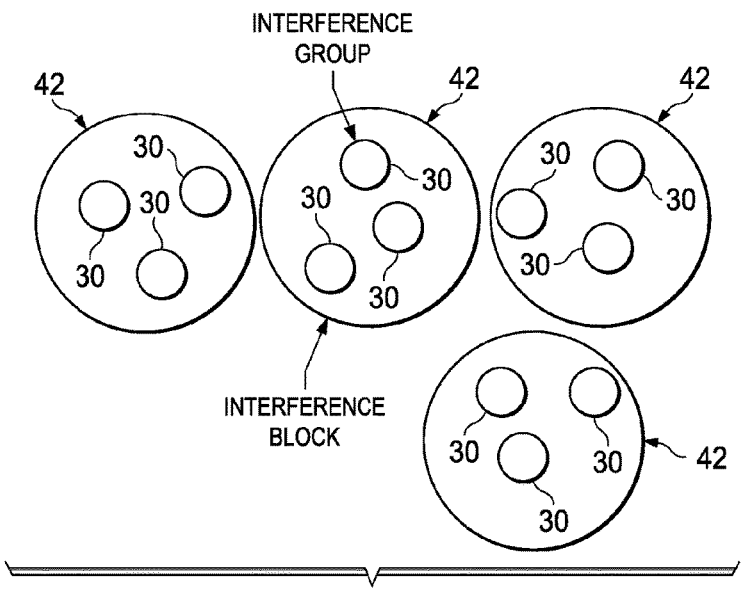
FIG. 4 is a simplified block diagram illustrating yet other example details of embodiments of the communication system.

Turning to FIG. 4, FIG. 4 is a simplified block diagram illustrating example details of an embodiment of communication system 10. In some embodiments, MAC scheduler 26 may operate centrally in cable network 12, implementing T-R coordination centrally, for example, at CMTS 14. MAC scheduler 26 categorizes cable modems 16 into interference groups 30, and schedules upstream transmissions and downstream receptions for cable modems 16 in each interference group 30, such that no cable modem of any one interference group transmits upstream in a frequency range simultaneously as another cable modem in the same interference group receives downstream in the frequency range. The scheduling can allow cable modems 16 in different interference groups 30 to transmit upstream and receive downstream simultaneously in the frequency range. MAC scheduler 26 generates scheduling information of the scheduling. The scheduling information may be comprised in appropriate MAC control messages in some embodiments. MAC scheduler 26 transmits the scheduling information to cable modems 16.

In various embodiments, downstream reception time is interleaved in a zig zag pattern such that downstream data spans multiple symbols overlapped with each other. In a general sense, "interleaving" refers to spreading data over some parameter; data spread over time is referred to as time interleaved data; data spread over frequency is referred to as frequency interleaved data. For example, data comprised in one symbol before interleaving is spread across 32 symbols after interleaving. Note that the term "symbol" has the general meaning familiar to persons with ordinary skill in the art and refers to a time interval for communicating bits of data that are modulated onto carriers at certain frequencies according to the modulation scheme used for the communication (e.g., in a single carrier modulation scheme, as higher data rates are used, the duration of one symbol becomes smaller); data is coded into the frequency domain one symbol at a time. In other words, data is carried in communication channels in cable network 12 in units of symbols in the time domain and frequency sub-carriers in the frequency domain.

Prior to interleaving, subsequent symbols containing downstream data are not overlapped; after interleaving, the downstream data spans multiple symbols and is effectively overlapped with itself. In an example, a packet of data that fits into one or two symbols occupies 32 symbols after interleaving. In various embodiments, upstream transmission time is not interleaved. In various embodiments, downstream transmission frequency is interleaved across a downstream symbol spanning a frequency range of an orthogonal frequency division multiplex (OFDM) resource block (e.g., 192 MHz) (and not the entire frequency spectrum available for cable network 12). Upstream transmission frequency is interleaved across an upstream symbol. The upstream symbol is aligned with the downstream symbol.

To facilitate interleaving in the time and frequency domain, interference groups 30 may be further sorted into interference blocks (IBs) 42. Each interference block 42 comprises a plurality of symbols including a symbol for guard time, with interleaving being implemented using interference blocks 42. In some embodiments, cable modems 16 may be sorted into interference groups 30 at initialization using a special IG Discovery process. Interference groups 30 are sorted into interference blocks 42. Note that interference blocks 42 can comprise any suitable (e.g., convenient, appropriate) grouping of interference groups 30. In an example embodiment, interference blocks 42 may be designated by small letters a, b, c, d, for example, to distinguish them from DOCSIS 3.1 profile designations of capital letters A, B, C, D. In an example embodiment, any one interference block 42 may equal 32 symbols (comprising the interleaved symbols) and one additional symbol for guard time, totaling 33 symbols in all. The guard time symbol may not be a dedicated symbol, but may be conveniently chosen based on the data pattern or other parameters as appropriate.

In some embodiments, a number (e.g., 100) of interference groups 30 may be mapped to a relatively much smaller number (e.g., 4) of interference blocks 42. In other embodiments, a number of interference groups 30 (e.g., 100) may be mapped to an equal or similar order of magnitude number of interference blocks 42 (e.g., 100 or 50). In the latter embodiments, each interference block 42 may serve as a guard time in downstream transmissions from CMTS 14 to cable modems 16. The upstream transmissions would ignore 3× interference block times (e.g., first interference block time during which it is supposed to receive downstream data, and two other interference blocks on either side of the first interference block time). With dynamic assignment of interference groups 30 to interference blocks 42, each interference group 30 can get 97% of the spectrum between downstream reception and upstream transmission. In a general sense, delay and timing differences within any one of interference groups 30 can be accommodated with a one symbol guard time, whereas delay and timing differences between CMTS 14 and interference groups 30 may be accommodated with additional guard time.

Figure 5:
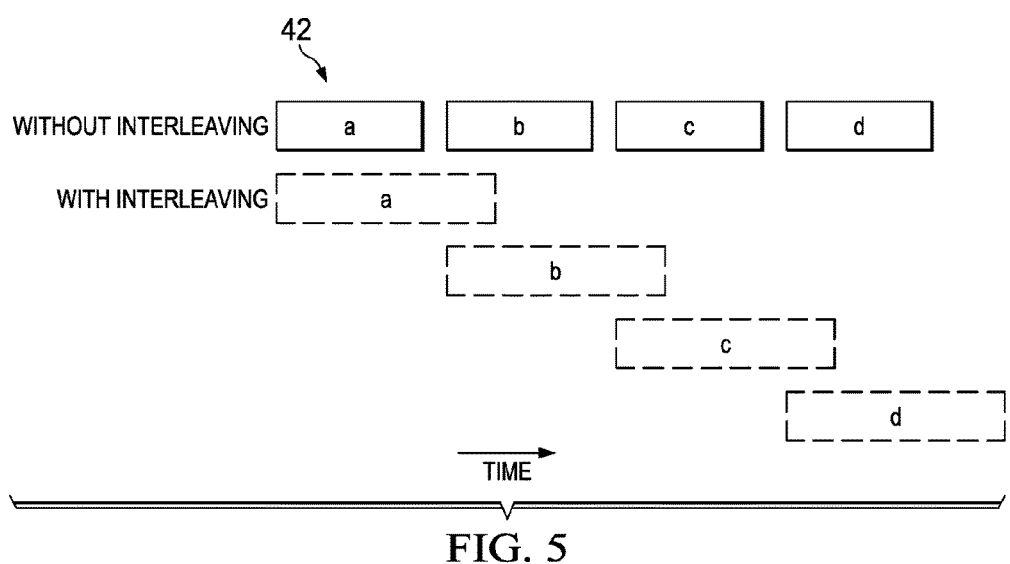
FIG. 5 is a simplified block diagram illustrating yet other example details of embodiments of the communication system.

Turning to FIG. 5, FIG. 5 is a simplified block diagram illustrating example details according to an embodiment of communication system 10. Consider an example transmission comprising four interference blocks 42. In other words, interference groups 30 are categorized into 4 interference blocks 42 (e.g., 100 interference groups map to 4 interference blocks), namely, a, b, c, and d. Without time interleaving, interference blocks a, b, c, d may be stacked one after the other in a repeating pattern. With time interleaving, interference blocks a, b, c, and d may overlap with each other in time according to the extent of interleaving. In some embodiments, time offset may also be implemented, for example, with the next set of interference blocks 42 being some time apart from the previous set of interference blocks 42, for example, to account for time delays and other factors. Such time offset may include guard times to account for delays among cable modems 16, between CMTS 14 and cable modems 16, etc.

Figure 6:
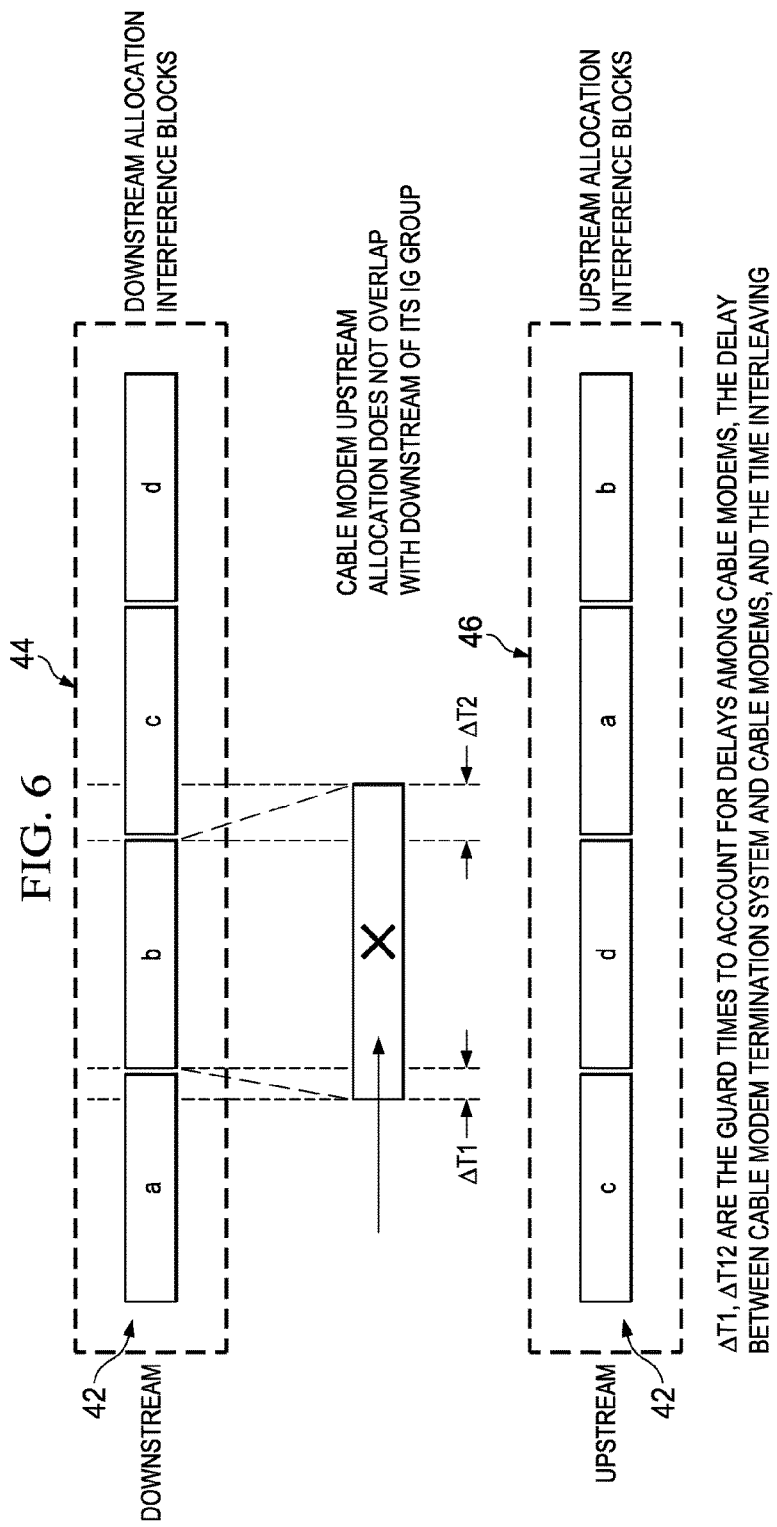
FIG. 6 is a simplified block diagram illustrating yet other example details of embodiments of the communication system.

Turning to FIG. 6, FIG. 6 is a simplified block diagram illustrating example details according to an embodiment of communication system 10. In non-full-duplex cable networks, a cyclic prefix (CP) is different for the downstream symbol and the upstream symbol because they are at different frequencies. However, with full duplex communication, the downstream symbol and upstream symbol can be at the same frequency. In various embodiments, the CP is the same for a particular frequency, regardless of the direction (e.g., upstream or downstream) of transmission, facilitating alignment of downstream and upstream symbols per OFDM resource block. In some embodiments, the time-space alignment of downstream symbols with upstream symbols can be represented figuratively by trapezoids in the downstream lining up with rectangles in the upstream direction. The "bottom" side of the trapezoid would be different in length from the "top" side depending on the amount of time interleaving. In such a figurative representation, the top of the downstream trapezoid would be zero interleaved and can be considered a reference point.

Consider an example transmission comprising four interference blocks 42. In other words, interference groups 30 are categorized into 4 interference blocks 42 (e.g., 100 interference groups map to 4 interference blocks), namely, a, b, c, and d. In such example embodiments, if all interference blocks 42 are of equal bandwidth, then each interference group 30 is only getting 25% of the frequency spectrum.

Each interference block 42 is 33 symbols wide in this example. Assume that interference blocks 42 allocated for downstream transmission are referred to as downstream blocks 44 in pattern a-b-c-d-repeat; interference blocks 42 allocated for upstream transmission are referred to as upstream blocks 46 in pattern c-d-a-b-repeat. Downstream blocks 44 could be lined up with the upstream blocks 46 with an offset of 2 blocks. The gap between blocks a and c is the guard time (comprising blocks b and d). The guard time is at least 32 symbols wide to accommodate downstream frequency interleaving. An extra symbol is included to allow for time differences within an interference group for a total of 33 symbols.

Figure 7:
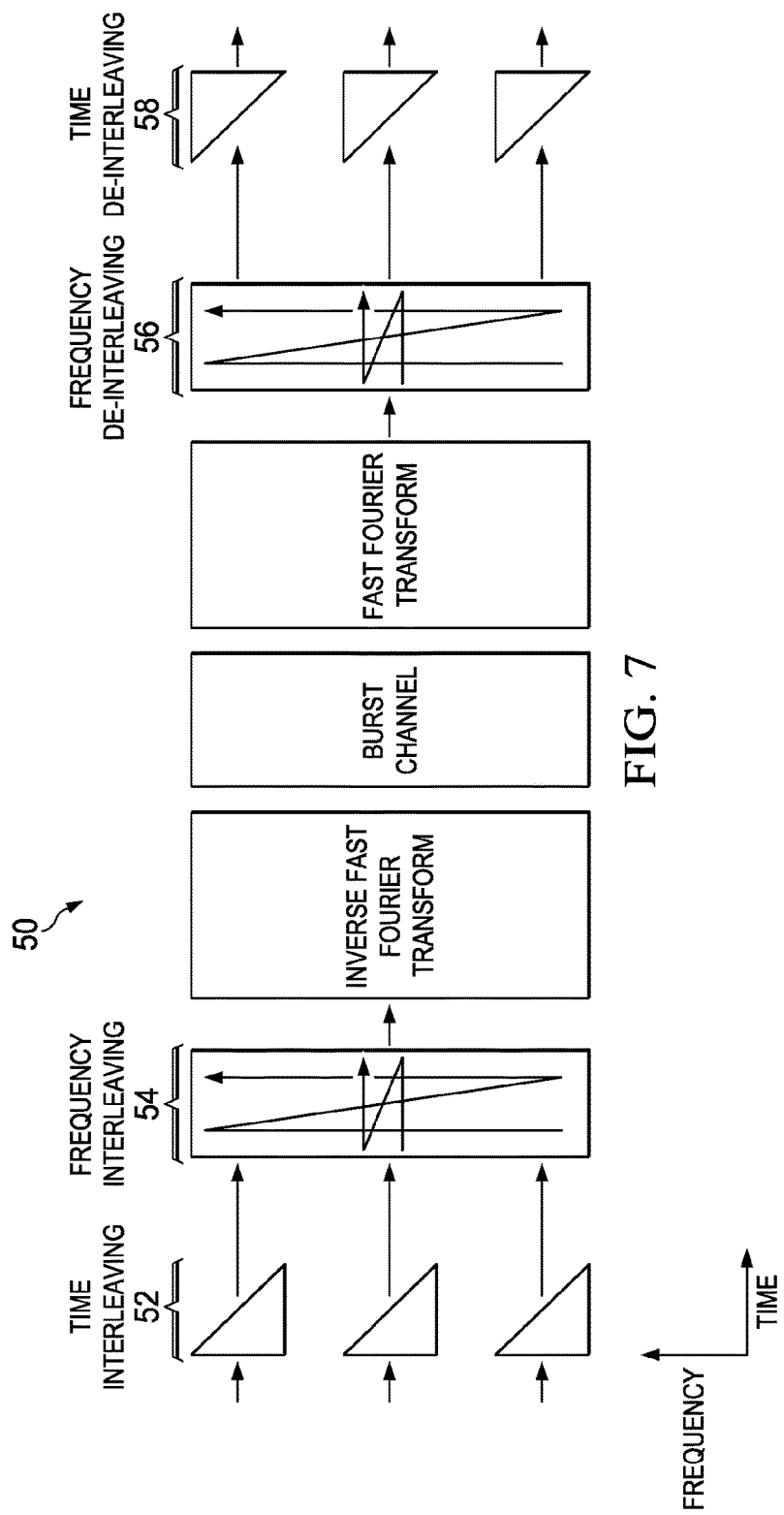
FIG. 7 is a simplified block diagram illustrating yet other example details of embodiments of the communication system.

Turning to FIG. 7, FIG. 7 is a simplified block diagram illustrating example details according to an embodiment of communication system 10. In a general sense, when a time domain interleaving scheme is typically implemented at the symbol level, different carriers of the OFDM symbol are delayed by different amounts. As the carrier allocation is along frequency, the interleaving in time will be effective for burst interferences; the interferences will be spread across the symbols in time axis, into multiple forward error correction (FEC) blocks. In the case where the burst interference covers many sub-carriers, the interleaving depth is large enough to minimize the numbers of interfered sub-carriers for each FEC block. However, time interleaving introduces delay, which equals the interleaving depth.

According to some embodiments, interleaving 50 takes advantage of the multiple FEC blocks along frequency at each symbol. Time interleaving 52 is performed on the symbols, and frequency interleaving 54 is added to time interleaving 52, for example, to achieve better interleaving efficiency with minimized delay. Accordingly, symbols at each symbol time are re-arranged through a simple storage access scheme without introducing any delay. With addition of frequency interleaving 54 to time interleaving 52, effective interleaving depth is a product of frequency interleaving depth and time interleaving depth. Interleaved data is subjected to Inverse Fast Fourier Transform (IFFT) and sent across a burst channel. At the receiver, the received data is subjected to Fast Fourier Transform (FFT) and frequency de-interleaving 56, followed by time de-interleaving 58.

Figure 8:
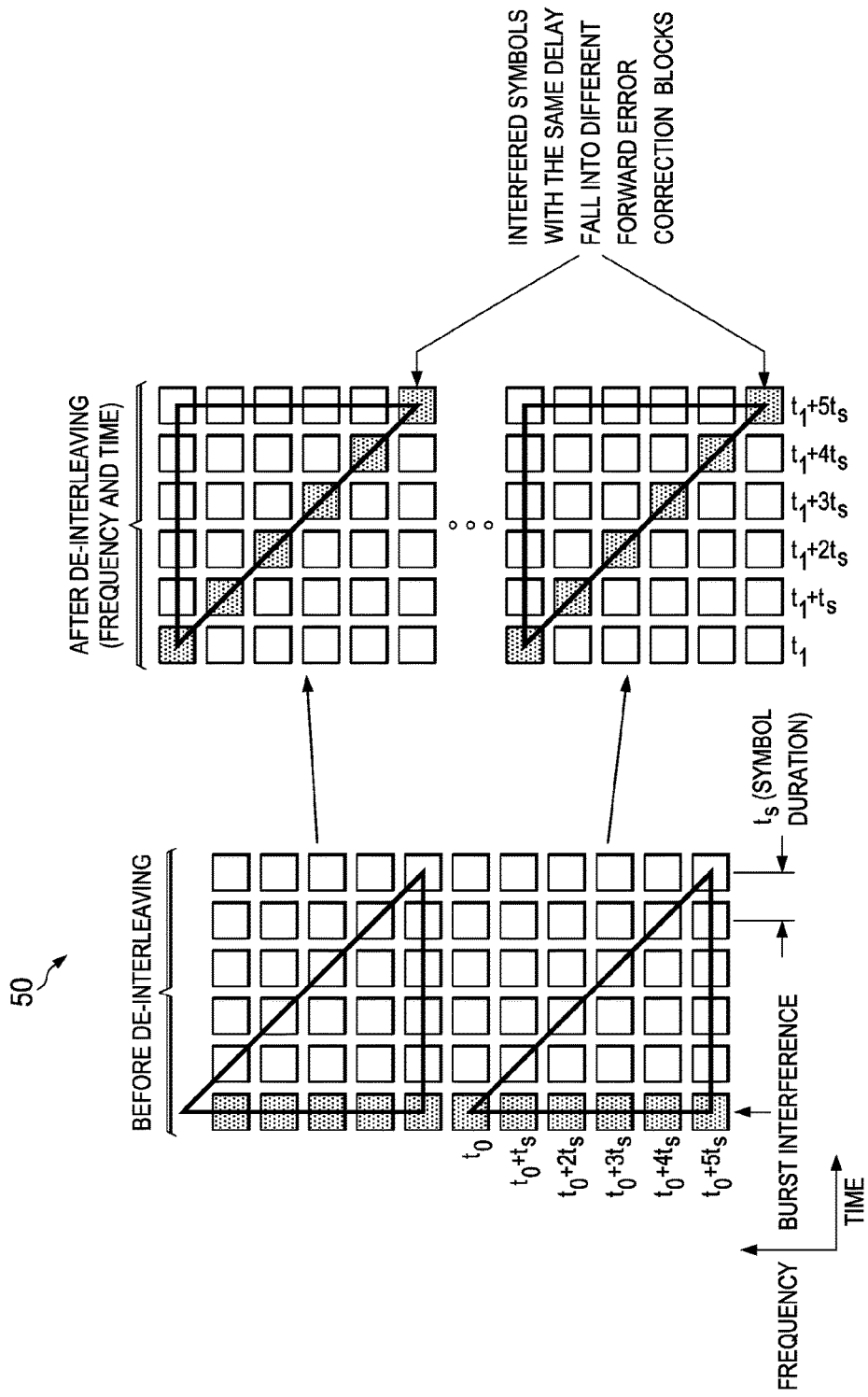
FIG. 8 is a simplified block diagram illustrating yet other example details of embodiments of the communication system.

Turning to FIG. 8, FIG. 8 is a simplified block diagram illustrating example details according to an embodiment of communication system 10. According to the embodiments interleaving 50, in which time interleaving 52 is added to frequency interleaving 54, interferences fall into different FEC blocks after de-interleaving even with shallow interleaving depth along time, leading to enhanced interleaving performance with a minimum delay.

Figure 9:
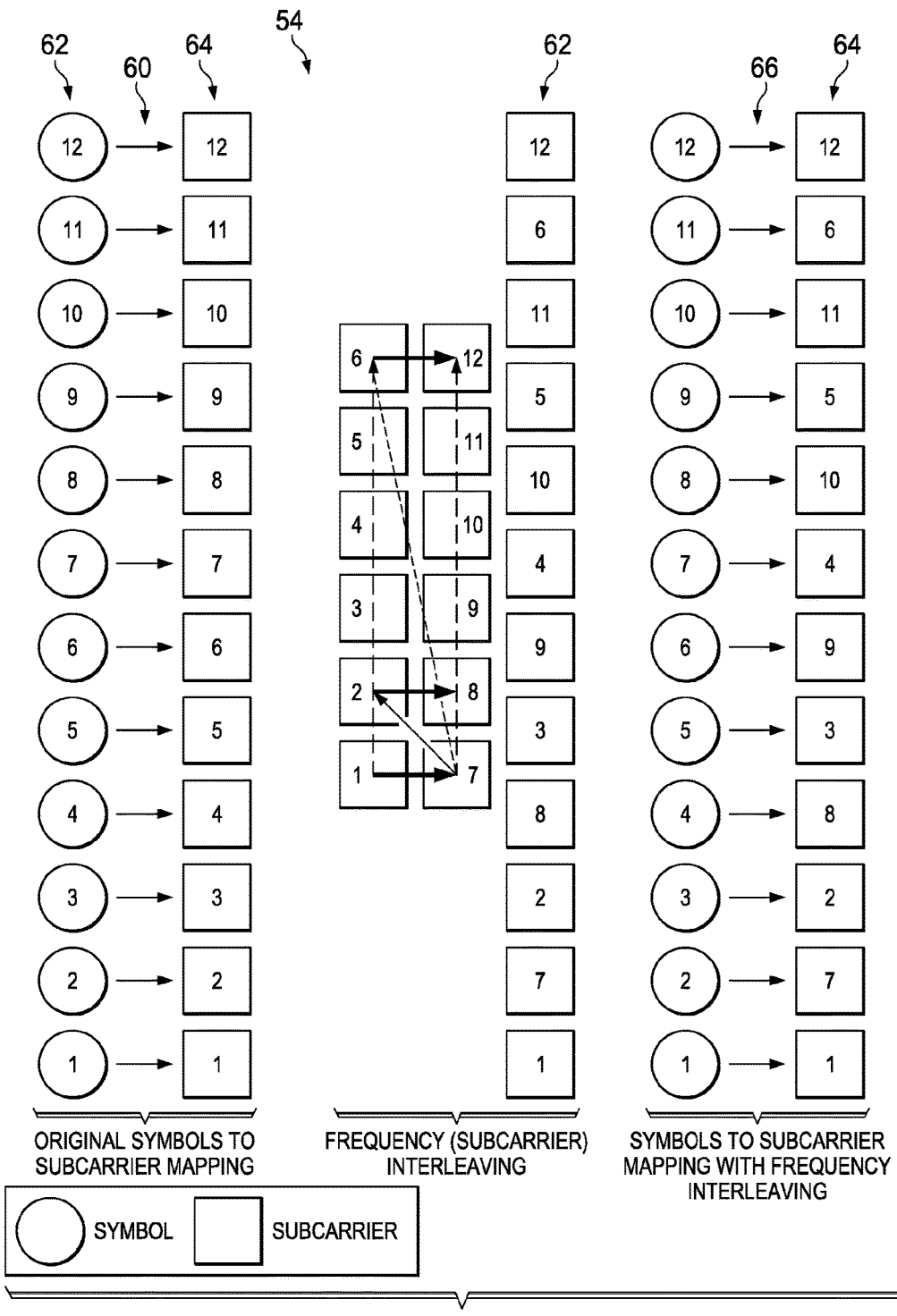
FIG. 9 is a simplified block diagram illustrating yet other example details of embodiments of the communication system.

Turning to FIG. 9, FIG. 9 is a simplified block diagram illustrating example details of frequency interleaving 54 according to an embodiment of communication system 10. Consider a hypothetical example comprising a mapping 60 between symbols 62 and sub-carriers 64. Twelve symbols 62 are mapped to corresponding twelve sub-carriers 64 in mapping 60. According to frequency interleaving 54, sub-carriers 64 are arranged into two columns and are ordered in an ascending order along each of the columns (e.g., 1-6 in column 1 and 7-12 in column 2). Sub-carriers 64 are re-ordered by reading the rows of the two columns in an ascending order (e.g., bottom to top). The final order of sub-carriers 64 after frequency interleaving 54 is no longer in a purely ascending order. Final mapping 66 between symbols 62 and sub-carriers 64 is different from mapping 60 before frequency interleaving 54.

Figure 10:
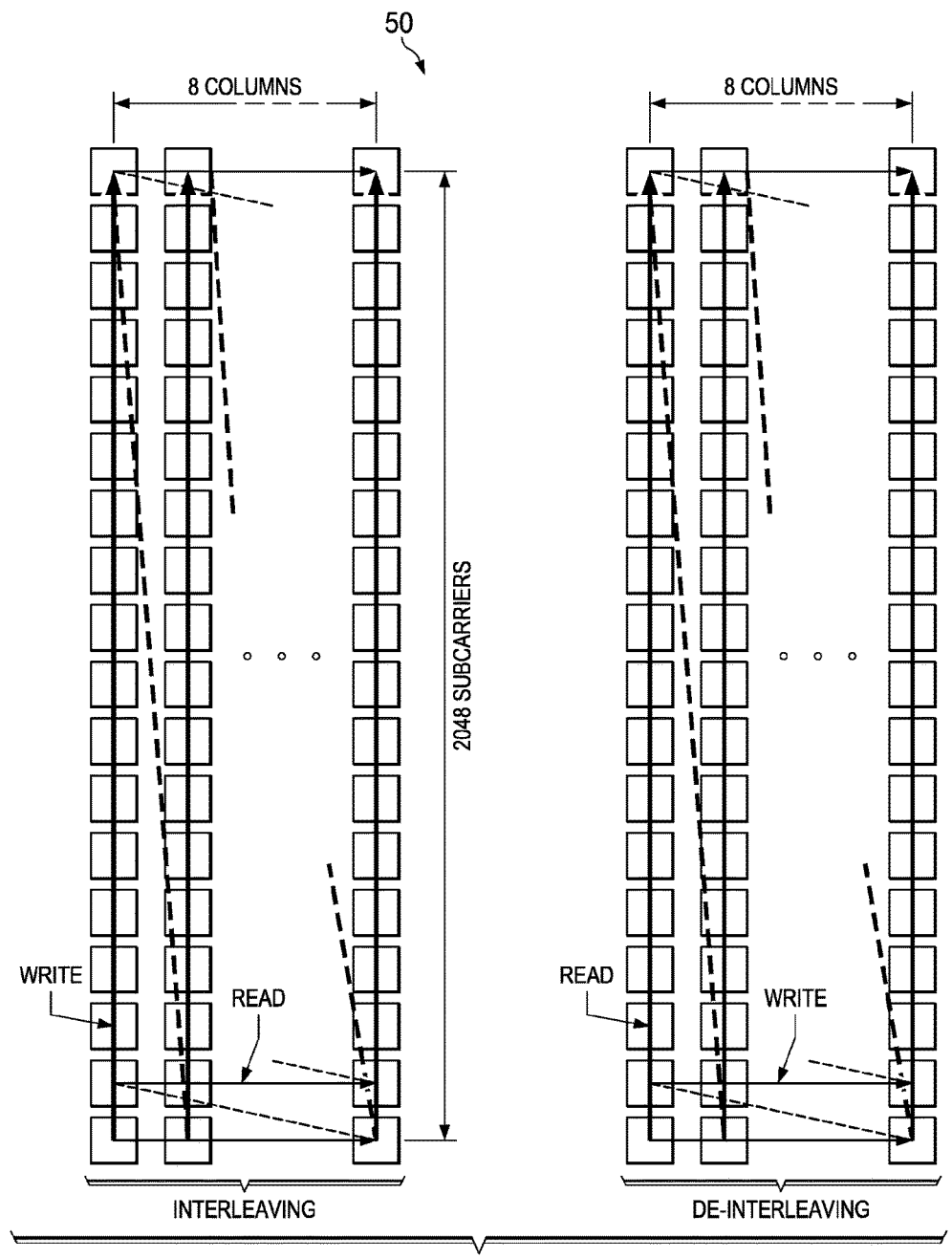
FIG. 10 is a simplified block diagram illustrating yet other example details of embodiments of the communication system.

Turning to FIG. 10, FIG. 10 is a simplified block diagram illustrating example details of interleaving 50 according to an embodiment of communication system 10. To explain further, consider an example with 16384 sub-carriers (192 MHz, 12.5 kHz CS). The 16384 sub-carriers are arranged into 8 columns, each column having 2048 sub-carriers. With 16200 bit-density parity-check (LDPC) and 256-Quadrature amplitude modulation (QAM), each column has one FEC codeword (CW). At the interleaving stage, mapping between symbols and sub-carrier is such a way that the symbols are written along columns, and read out along rows. At the de-interleaving stage, symbols are written along rows, and read out along columns.

Figure 11:
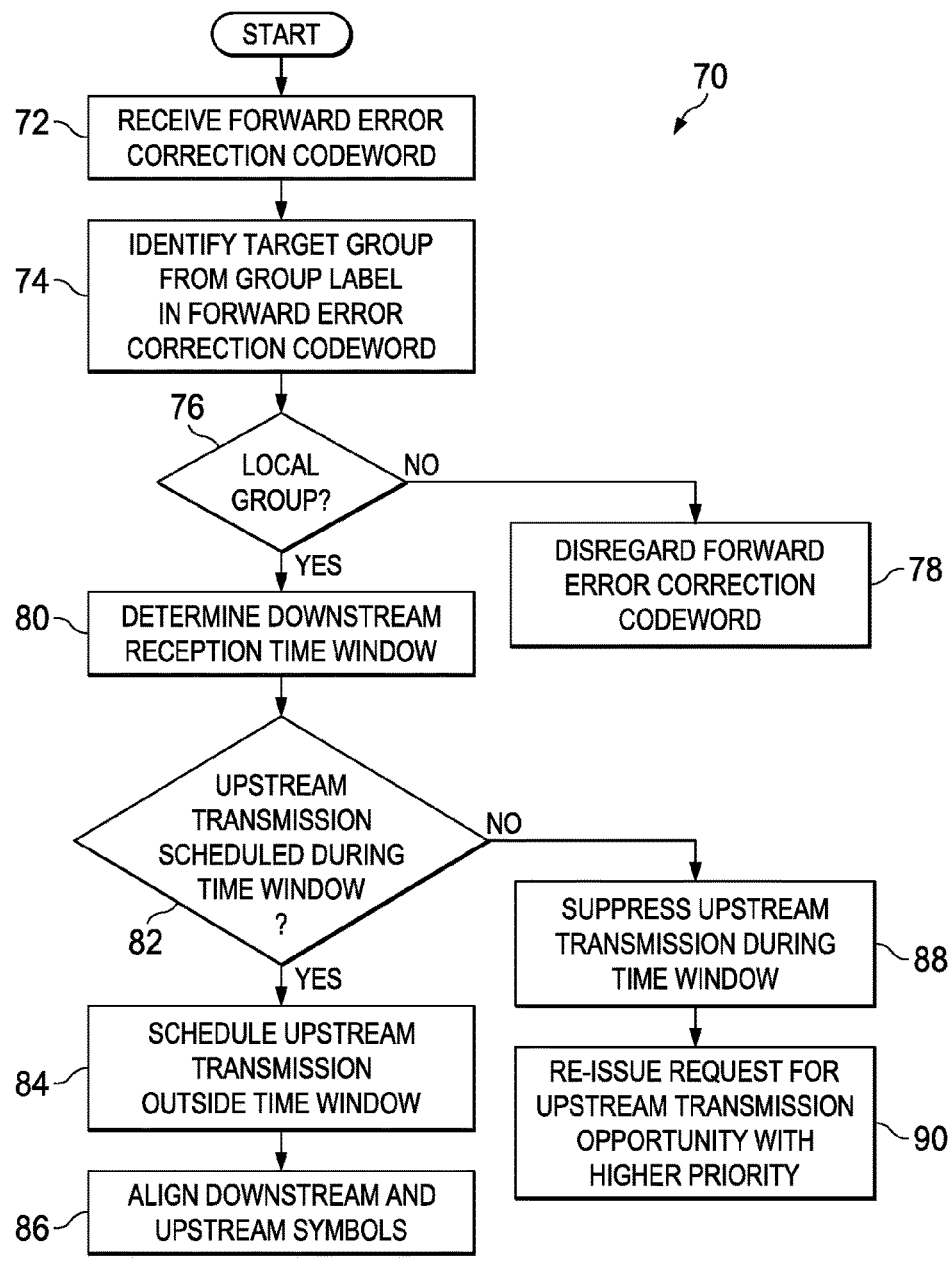
FIG. 11 is a simplified flow diagram illustrating example operations that may be associated with an embodiment of the communication system.

Turning to FIG. 11, FIG. 11 is a simplified flow diagram illustrating example operations 70 according to an embodiment of communication system 10. Operations 70 may be assumed to be executed at a specific one of cable modems 16. In some embodiments, a distributed intelligent scheduling scheme is implemented by MAC scheduler 26 for T-R coordination, for example, to make the scheduling scheme more scalable. The distributed intelligent scheduling is enforced by cable modems 16 and is not centrally enforced at CMTS 14. The distributed scheduling scheme keeps the downstream and upstream scheduling asynchronous with each other.

In general, according to the distributed scheduling scheme, cable modems 16 are divided into a large number of interference groups 30, each having a relatively small number of cable modems 16. Interference groups 30 are established with a IG Discovery process. Downstream transmission in a frequency range from CMTS 14 to cable modems 16 is implemented in one or more transmission units, such as FEC CW. Each FEC CW includes a group label identifying the specific interference group that is receiving data for that FEC CW, distinguishing the downstream transmission in the frequency range to the interference group from downstream transmissions to other interference group. In an example embodiment, the FEC CW group label may be included in a FEC next codeword pointer field (NCP) according to DOCSIS 3.1 standards. At 72, the cable modem executing operations 70 receive the FEC CW. At 74, it identifies the target interference group from the group label in the FEC CW. At 76, a determination is made whether the target interference group is the same as the local interference group to which the cable modem belongs. If the local interference group is not the target interference group, the FEC CW (and subsequent downstream transmission) may be disregarded at 78.

If the local interference group is the target interference group, the cable modem determines the downstream reception time window at 80. The group label in the FEC CW is several CW times in advance or in a separate structure so that the cable modem in the target interference group can anticipate receiving the downstream data ahead of actual reception, and schedule upstream transmission accordingly. At 82, the cable modem makes a determination whether it has scheduled any upstream transmission during the anticipated time window. According to various embodiments, cable modems 16 in the target interference group receiving the FEC CW are not allowed to transmit upstream. Because cable modems 16 request bandwidth ahead of time of upstream transmission, some cable modems 16 may have received a grant during the time window of downstream transmission. (CMTS 14 is not enforcing scheduling restrictions, and freely issues grants.) Thus, the determination at 82 may include identifying any grants available for use during the anticipated time window.

If no upstream transmission is scheduled, at 84, the cable modem schedules upstream transmission outside the anticipated time window (e.g., prior to, or after, the anticipated time window). At 86, the cable modem associates minislots or symbols times in upstream transmissions with minislots or symbols in downstream receptions, aligning upstream and downstream symbols. On the other hand, if upstream transmission is scheduled, at 88, the cable modem suppresses upstream transmission during the anticipated time window, forfeiting the upstream transmission opportunity. At 90, the forfeiture can be managed by re-issuing requests to CMTS 14 with higher priority. In some embodiments, CMTS 14 may poll target cable modems to which it is sending downstream transmissions to check on suppressed transmissions.

In some embodiments, downstream bandwidth per cable modem being limited, downstream bandwidth per interference group can be rate-limited in a hierarchical manner to prevent upstream transmissions from being locked out. Embodiments of communication system 10 may not require any downstream and upstream calibration and alignment at CMTS 14. Long guard times may also be unnecessary, for example, due to large serving area sizes. The reference is local to the cable modems 16 that are close enough to impact each other. In various embodiments, cable modems 16 are "warned" ahead of time of downstream transmission of data and can suppress upstream transmission accordingly.

Each one of interference groups 30 becomes a simplex group in which transmission occurs in one direction at a time. Because the sizes (e.g., memberships) of interference groups 30 are small and there are many of them, the overall effect in cable network 12 is full duplex communication. In various embodiments, any one cable modem has an aggregate bandwidth equal to one copy of the full spectrum. The overall interference group on a node has an aggregate bandwidth equal to two times the spectrum.

In some embodiments that include the distributed intelligent scheduling, a first interference group predicts that a particular frequency range is not going to be used for upstream transmission by a second interference group and hijacks the frequency range for its own upstream transmission. Prediction may be based upon traffic to one or more cable modems in the second interference group, priorities of traffic or devices, back-up list information from CMTS 14, set of contention REQ slots, or other suitable parameters.

Figure 12:
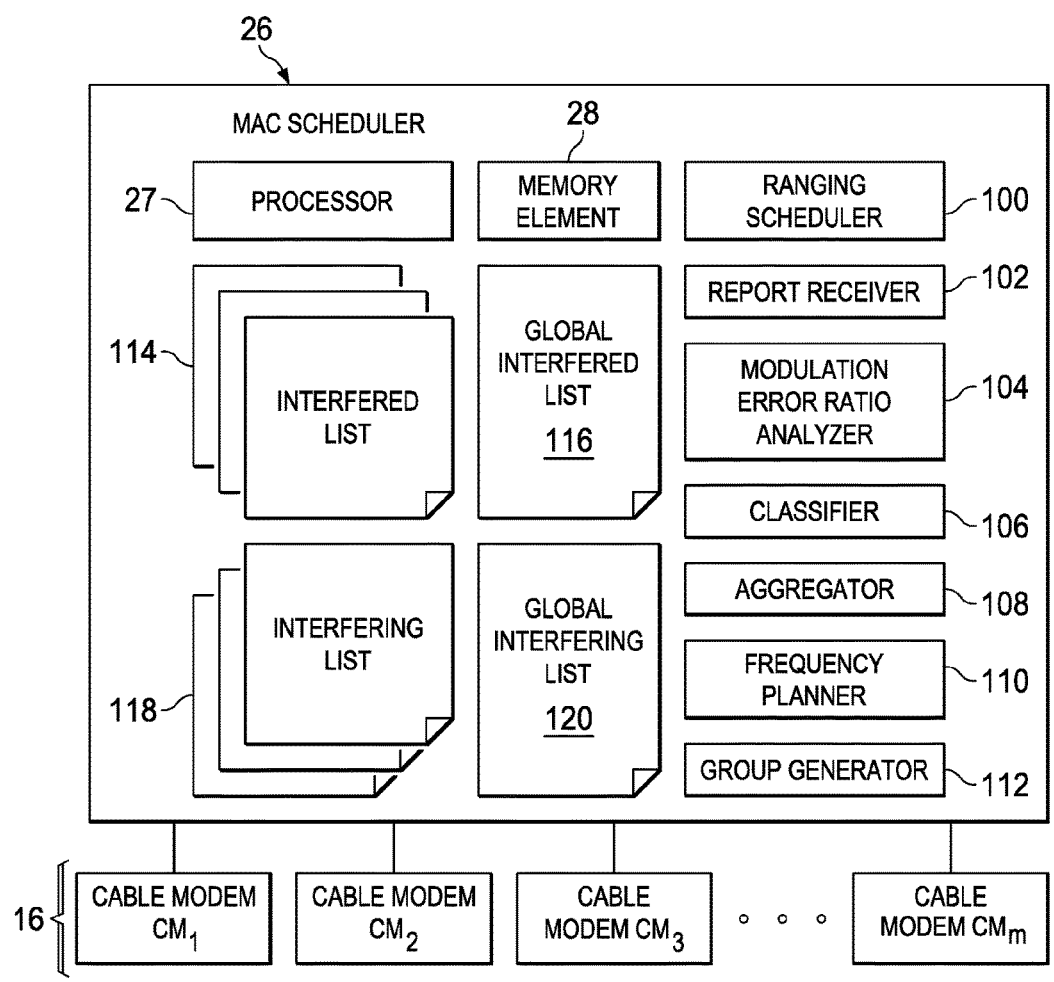
FIG. 12 is a simplified block diagram illustrating yet other example details of embodiments of the communication system.

Turning to FIG. 12, FIG. 12 is a simplified block diagram showing example details of MAC scheduler 26 according to embodiments of communication system 10. MAC scheduler 26 includes an IG Discovery test signal scheduler 100, a report receiver 102, a MER analyzer 104, a classifier 106, an aggregator 108, a frequency planner 110, and a group generator 112. Memory element 28 may store various data, including one or more interfered list 114, a global interfered list 116, one or more interfering list 118, and a global interfering list 120.

During frequency planning and grouping, MAC scheduler 26 may generate, for a particular one of cable modems 16 (say $CM_1$) in cable network 12, interfered list 114 associated with a frequency range. Interfered list 114 comprises a first list of cable modems 16 whose downstream reception in the frequency range is interfered by upstream transmissions of cable modem $CM_1$ in the frequency range. Assume, merely for example purposes, that the first list of cable modems comprises cable modems $CM_2$ and $CM_3$. In other words, interfered list 114 for $CM_1$ comprises $CM_2$ and $CM_3$. MAC scheduler 26 may repeat the interfered list generating process for other cable modems 16 (e.g., $CM_1$ ... $CM_m$) in cable network 12. For example, interfered list 114 for $CM_2$ may comprise $CM_2$ and $CM_m$; interfered list 114 for $CM_3$ may comprise $CM_1$ ... $CM_m$; etc.

The interfered list generating process is repeated for other frequency ranges in the frequency spectrum used in cable network 12. For example, the frequency spectrum may be divided into n frequency ranges (e.g., $F(1)$ to $F(n)$), and the interfered list generating process may be repeated for each one of the n frequency ranges, with separate interfered lists 114 being generated for each frequency range and each cable modem in cable network 12. Aggregator 108 may aggregate the generated interfered lists into global interfered list 116.

MAC scheduler 26 may further generate, for one of cable modems 16, say $CM_1$, interfering list 118 associated with the frequency range. Interfering list 118 comprises a second list of cable modems whose upstream transmissions in the frequency range interfere with downstream reception of cable modem $CM_1$ in the frequency range. Assume, merely for example purposes, that the second list of cable modems comprises cable modems $CM_2$ ... $CM_m$. In other words, interfering list 118 for $CM_1$ comprises $CM_2$, $CM_3$, ... $CM_m$. MAC scheduler 26 may repeat the interfering list generating process for other cable modems 16 (e.g., $CM_1$ ... $CM_m$) in cable network 12. For example, interfering list 118 for $CM_2$ may comprise $CM_1$ and $CM_3$; interfering list 118 for $CM_3$ may comprise $CM_2$; etc. The interfering list generating process is repeated for other frequency ranges $F(1)$-$F(n)$ in the frequency spectrum used in cable network 12. Aggregator 108 may aggregate the generated interfering lists into global interfering list 120.

In various embodiments, to generate interfered list 114 for cable modem $CM_1$ for a particular frequency range, say $F(1)$, IG Discovery Test scheduler 100 schedules cable modem $CM_1$ to transmit a test signal within the frequency range $F(1)$ during a maintenance window (e.g., initial ranging window; contention window; etc.). Report receiver 102 receives reports indicative of interferences on respective downstream reception at the frequency from other cable modems $CM_2$ ... $CM_m$ in cable network 12. The reports include MER values. MER analyzer 104 analyzes the received reports and identifies cable modems $CM_2$ and $CM_3$ that are interfered by the transmitting cable modem $CM_1$ based on the reports. The identification may be based on the value of MER exceeding a predetermined threshold (either absolute or relative). For example, $CM_2$ and $CM_3$ may have reported the highest MER values among cable modems $CM_2$ ... $CM_m$. Classifier 106 adds the identified cable modems $CM_2$ and $CM_3$ to the first list and into interfered list 114 for the cable modem $CM_1$.

In various embodiments, generating interfering list 118 for the cable modem $CM_1$ (and other cable modems 16) comprises deriving the second list of cable modems from global interfered list 116. For example, for cable modem $CM_1$ and each frequency range, from global interfered list 116, classifier 106 looks up the cable modems that interfere with the cable modem $CM_1$ on that frequency range. The interfering cable modems are entered as entries for the cable modem $CM_1$ on that frequency range in corresponding interfering list 118. In various embodiments, interfering list 118 and interfered list 114 are not updated often; they may be updated when changes are made to cable network 12, for example, additional cable modems are added, or existing cable modems are removed.

Frequency planner 110 assigns respective downstream reception frequency ranges and upstream transmission frequency ranges for cable modems 16 ($CM_1$ ... $CM_m$) based on global interfered list 116 and global interfering list 120. For example, $CM_1$ may be assigned downstream reception frequency range $F(1)$ and upstream transmission frequency range $F(3)$; $CM_2$ may be assigned downstream reception frequency range $F(3)$ and upstream transmission frequency range $F(n)$; and so on. In various embodiments, the assigning is on a first-come-first serve basis. For example, downstream reception frequency range may be selected from among the frequency ranges and assigned to the first available (e.g., recognized, identified, listed, sorted, etc.) unassigned cable modem to the exclusion of other cable modems based on global interfered list 116 and global interfering list 120.

The assigning may be based on un-aggregated lists alternatively in some embodiments. Note that the aggregation operation is merely for convenience and may be skipped without departing from the scope of the embodiments. MAC scheduler 26 transmits to cable modems 16 ($CM_1$ ... $CM_m$) corresponding assignment information comprising the respective assigned downstream reception frequency ranges and upstream transmission frequency ranges.

In some embodiments, group generator 112 groups cable modems 16 into interference groups 30, each interference group being isolated on frequency basis from other interference groups, with cable modems in each group being assigned a common downstream reception frequency range and a common upstream transmission frequency range. For example, cable modems $CM_1$, $CM_2$ and $CM_3$ may be assigned to group A. Cable modems $CM_1$, $CM_2$ and $CM_3$ may be assigned a common downstream reception frequency range of F(1) and a common upstream transmission frequency range of F(2). In some embodiments, the grouping is based on interfered list 114. For example, the cable modem $CM_1$ is grouped with the first list of cable modems comprising the cable modems $CM_2$ and $CM_3$ into interference group A for the frequency range F(1). In other words, when grouping is based on interfered list 114, downstream receptions of cable modems in each interference group for the corresponding frequency range are interfered by upstream transmissions of the cable modem in the corresponding frequency range.

In some embodiments, grouping may take advantage of the natural network architecture. For example, the cable modem $CM_1$ is grouped into interference group A with other cable modems $CM_3$ and $CM_m$ connected to a commonly coupled amplifier in cable network 12. In some embodiments, interference groups are further divided into a plurality of sub-groups with relative isolation among the sub-groups, for example, in which each sub-group comprises cable modems attached to a corresponding common tap (which is further down the network towards the cable modems than the common amplifier of the interference group). In various embodiments, cable modems in the interference group transmit upstream at a first frequency and receive downstream at a different frequency within the frequency range. For example, the cable modem $CM_1$ transmits upstream at frequency $F_1$ and receives downstream at frequency $F_2$ within frequency range F(n).

Figure 13:
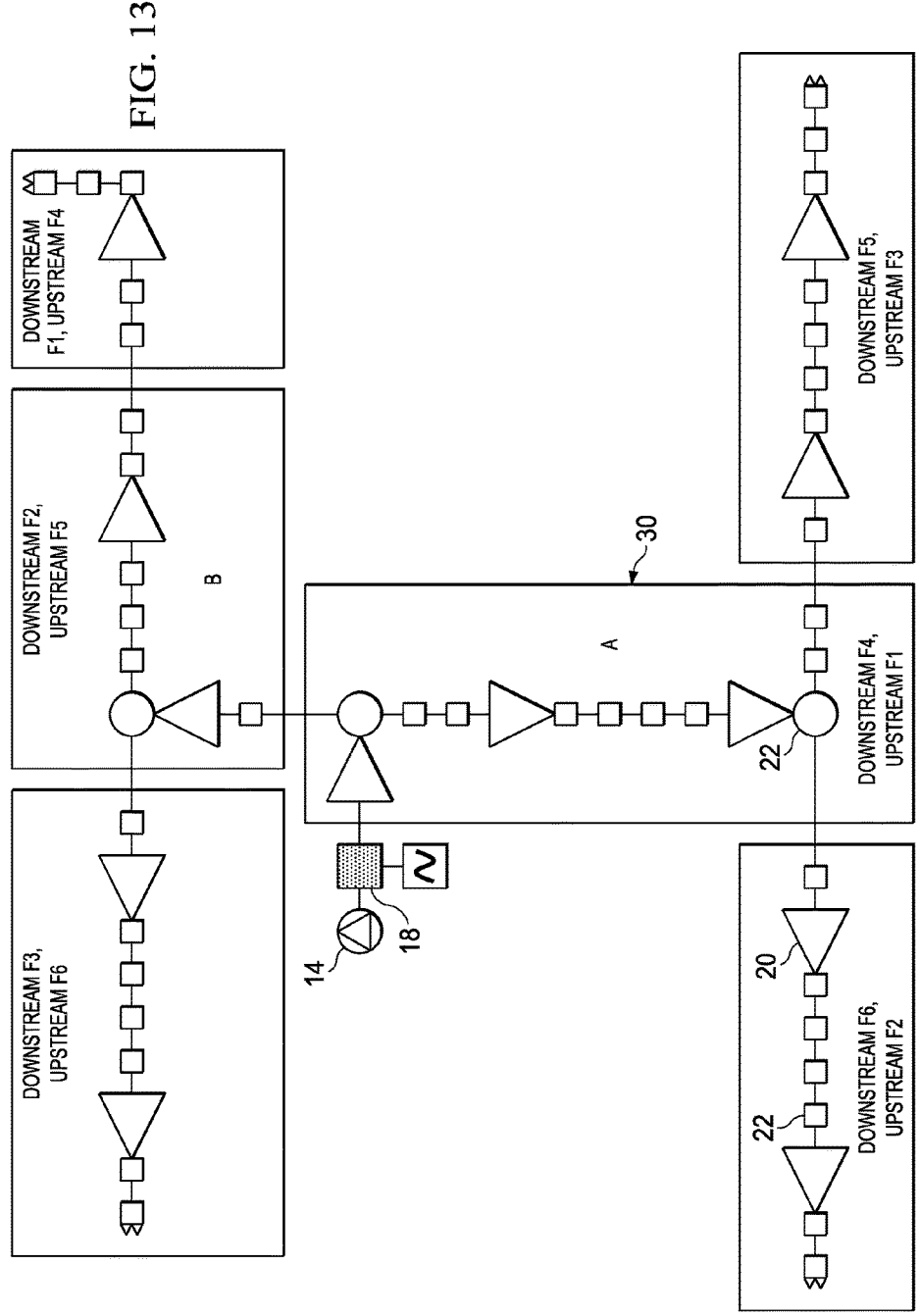
FIG. 13 is a simplified block diagram illustrating yet other example details of embodiments of the communication system.

Turning to FIG. 13, FIG. 13 is a simplified block diagram showing example details of CM grouping according to an embodiment of communication system 10. In various embodiments, cable modems 16 may be grouped into various interference groups 30 to enable full duplex communication with little to no interference. For the sake of simplicity and ease of illustration, cable modems 16 are not shown explicitly in the figure, but are merely represented by one (or more) taps and splitters 22. It may be appreciated that each tap/splitter 22 may be connected to one (or more) cable modems 16. Interference groups 30 may comprise RF isolated groups that allow frequency re-use through intelligent MAC scheduling.

Interference groups 30 provide a basis for T-R coordination in various embodiments. In a general sense, the purpose of T-R coordination is to avoid interference among cable modems 16. T-R coordination is a 2-dimensional resource allocation scheme that ensures that no CMs from the same interference group transmit simultaneously on a frequency that is being used by other CMs to receive data, and vice versa. The two dimensions comprise frequency and time.

In various embodiments, for a specific CM, its interference group is considered to be a group of CMs whose downstream receptions are interfered by the specific CM's upstream transmission. Interference groups could be frequency dependent. For example, in interference group A, cable modems 16 transmit upstream at frequency F1, and receive downstream at frequency F4, which is different from F1; in interference group B, cable modems 16 transmit upstream at frequency F5, and receive downstream at frequency F2; and so on. Cable modems 16 may belong to multiple interference groups, one for each frequency (e.g., carrier). In some embodiments, the interference may not be symmetric: a specific CM may interfere with another CM, but not the other way around. In other embodiments, the interference may be symmetric, with two CMs interfering with each other. For simplicity, relevant cable modems 16 (either interfere with or are interfered by, on any frequency) could be grouped into a single interference group. Cable modems 16 within each group tend to interfere with each other, but there are no or little interferences among cable modems 16 in different groups.

CMs that are within the same interference group may interfere with each other. That is, the upstream signal may not be sufficiently attenuated to be negligible in the combined signal. In some embodiments, the interference group may comprise CMs within the same tap group. Since there is no way of exactly knowing which CM is on which tap group, this has to be measured and the resulting groupings may not align exactly with a particular (e.g., single) tap group.

In an example embodiment, the frequency spectrum of cable network 12 may be divided into multiple frequency ranges. In some embodiments, each frequency range aligns with a channel boundary. For each specific one of cable modems 16 and each frequency range, MAC scheduler 26 may identify those cable modems 16 whose upstream transmissions interfere with downstream receptions of that specific one of cable modems 16, and those cable modems 16 whose downstream receptions are interfered by upstream transmissions of that specific one of cable modems 16, if they operate on that same frequency. Based on such identification, MAC scheduler 26 avoids assigning cable modems 16 to frequency ranges that may cause interferences among them. Cable modems 16 operate with FDD and no neighboring cable modems 16 are assigned to overlapping downstream and upstream frequency ranges.

Figure 14:
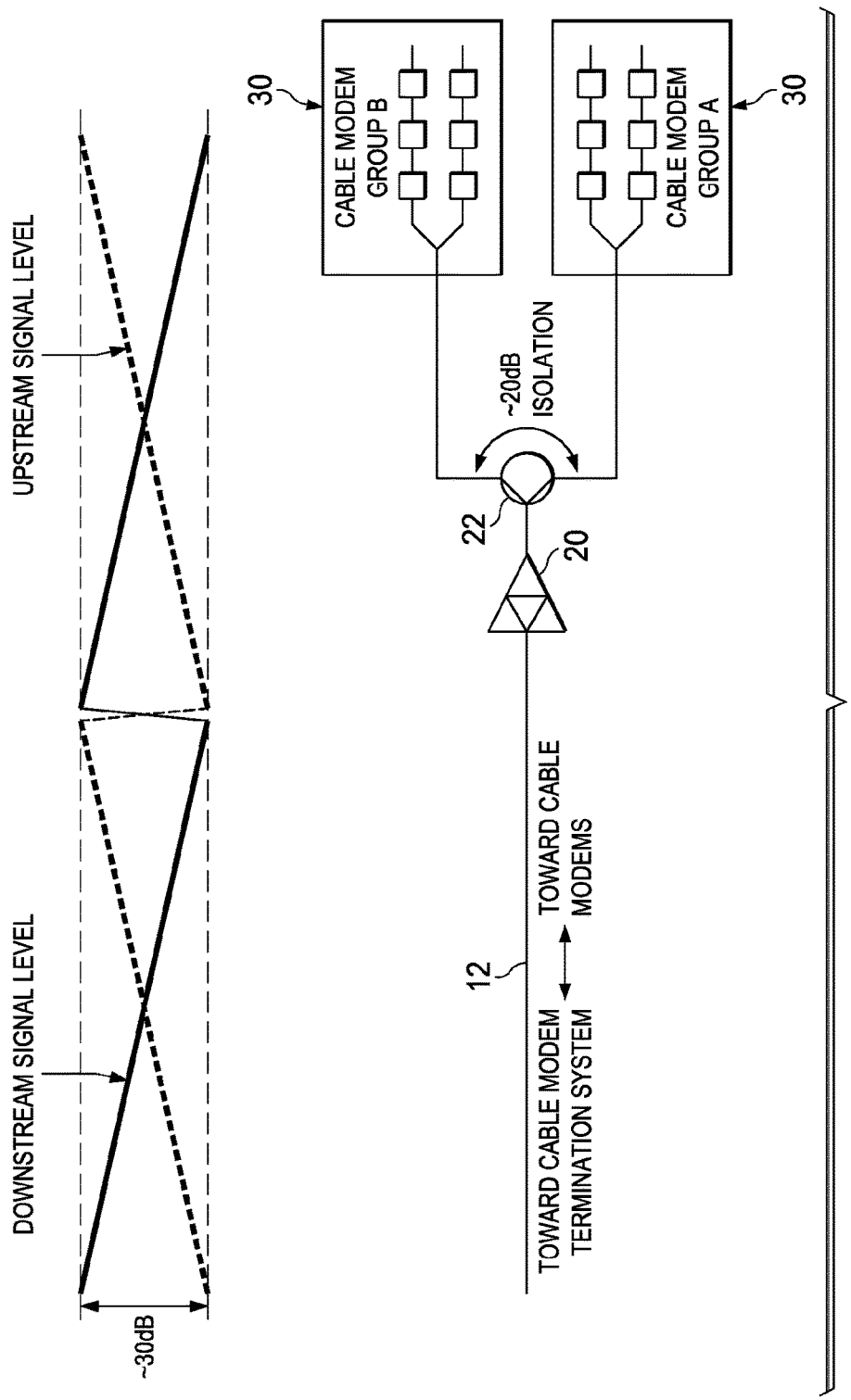
FIG. 14 is a simplified block diagram illustrating yet other example details of embodiments of the communication system.

Turning to FIG. 14, FIG. 14 is a simplified block diagram showing further example details of CM grouping according to an embodiment of communication system 10. In some embodiments, frequency planning can leverage isolations resulting from natural CM grouping in cable network 12. Note that cable network topology is largely driven by street and house layout and may vary dramatically from one community to others. The device performances (e.g., coupling, directivities, etc.) that dictate interference among cable modems 16 also vary in a wide range. Typically, distribution cables are branched out at the output of amplifier 20 (e.g., tree architecture). Taps and splitters 22 at amplifier 20 may provide approximately 20 dB isolation among cable modems 16 of each branch (e.g., division), whereas interference between downstream and upstream signals may be approximately 30 dB, permitting CMs in different groups to interfere only minimally, if at all. CMs covered by a single branch may belong to a single group in some embodiments. For example, two groups A and B of CMs that branch off after amplifier 20 may be unlikely to interfere with each other (cable modems 16 in group A will not interfere with cable modems 16 in group B and vice versa).

Figure 15:
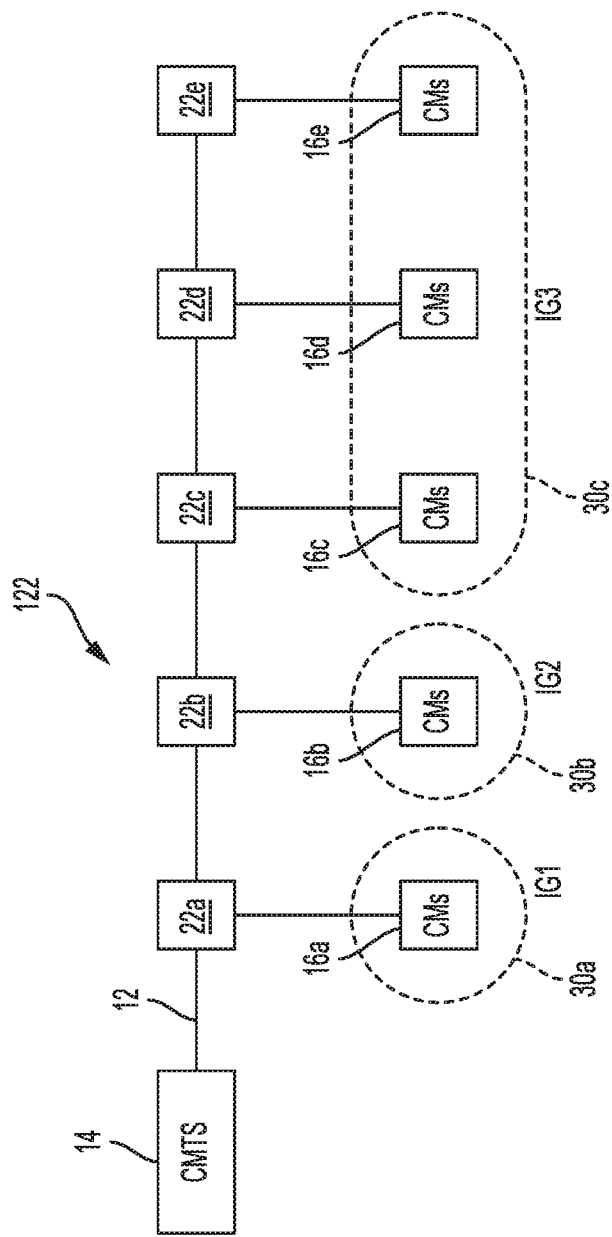
FIG. 15 is simplified block diagram illustrating another communication system comprising a full duplex network architecture in a cable network environment.

Turning to FIG. 15, FIG. 15 is simplified block diagram illustrating another communication system comprising a full duplex network architecture in a cable network environment. FIG. 15 illustrates a cable network 122 (indicated generally by an arrow) facilitating full duplex communication between a cable modem termination system (CMTS) 14 and one or more cable modems (CMs) 16a-16e. Network 122 includes taps and splitters 22a-22e. In the particular embodiment illustrated in FIG. 15, a first tap and splitter 22a is coupled to cable network 12 and in communication with a first group of CMs 16a, a second tap and splitter 22b is coupled to cable network 12 and in communication with a second group of CMs 16b, a third tap and splitter 22c is coupled to cable network 12 and in communication with a third group of CMs 16c, a fourth tap and splitter 22d is coupled to cable network 12 and in communication with a fourth group of CMs 16d, and a fifth tap and splitter 22e is coupled to cable network 12 and in communication with a fifth group of CMs 16e.

The full duplex (FDX) operation of cable access networks maximizes spectral utilization by enabling simultaneous downstream (DS) and upstream (US) transmissions among cable modems (CMs) that have sufficient RF isolation in passive coax cable networks. CMs interfering each other, on the other hand, are grouped into an interference groups (IG) for the CMTS to enforce the interference avoidance rule, such that within the IG, CMs do not transmit in the upstream and downstream direction over the same spectrum at the same time. In one or more embodiments, an interference group (IG) is a tap group that may contain one or more cable modems (CMs). An IG may also contain CMs from more than one tap groups, if the taps, for example, have poor port to port isolation. Multiple IGs may exist in a coax distribution network attached to a fiber node.

In general CMTS 14 is not aware of the physical topology of communication network 122 in terms, for example, of which particular tap and splitter a CM is connected to, how long a cable is between each tap and splitter, and how long a cable is between a particular tap and splitter and a CM. In order to determine interference levels between CMs, a interference group (IG) discovery procedure is performed in order to group CMs 16a-16e to enable full duplex communication with little or no interference. In particular embodiments, IGs 30a-30c may comprise radio frequency (RF) isolated groups that allow frequency re-use through intelligent MAC scheduling. IG discovery is required before a CM can operate in the FDX mode in order for the CMTS to enforce interference avoidance through spectrum allocations. In the embodiment illustrated in FIG. 15, an IG discovery procedure is performed to determine that three interference groups exist within network 122 in which a first IG (IG1) 30a includes the first group of CMs 16a, and a second IG (IG2) 30b includes the second group of CMs 16b. A third IG (IG3) 30c includes the third group of CMs 16c, the fourth group of CMs 16d, and fifth group of CMs 16e.

Given the large variation in RF topology and signal coupling/isolation performance in cable networks, it is desirable to have a measurement based IG discovery solution for a feasible FDX deployment. Various embodiments described herein provide for a measurement based interference group (IG) discovery mechanism that allows CMTS 14 to determine cable modems interference relationships at run time. Various embodiments are directed to a FDX system architecture with control and coordination residing in CMTS 14 and test signal insertion and measurement points located at the CMs 16a-16e. During IG discovery, CMTS 14 commands a particular CM to transmit upstream (US) test signals at specific locations in the FDX spectrum, and commands other CMs to capture and/or measure the signal leakage due to the test signals in the downstream (DS) spectrum. In one or more embodiments, a CM initializes into a IG discovery mode to contact CMTS 14 to initiate IG discovery in a bootstrapping operation. In particular embodiments, this bootstrapping occurs on a DOCSIS 3.1 Orthogonal Frequency-Division Multiple Access (OFDMA) channel, or a portion of an OFDMA channel in the FDX band that is excluded from downstream (DS) transmission. In particular embodiments, the IG discovery may occur during CM registration or after registration is complete. Once CMTS 14 successfully determines CM to IG mapping, it can enable the CM's FDX operation. In particular embodiments, CMTS 14 enables the CMs FDX operation by moving the CM to the upstream (US) channels in the FDX band with a DOCSIS Dynamic Bonding Change (DBC) mechanism. In still other embodiments, CMTS 14 enables the CMs FDX operation by granting upstream spectrum that overlaps with the downstream spectrum used by other IGs.

Figure 16:
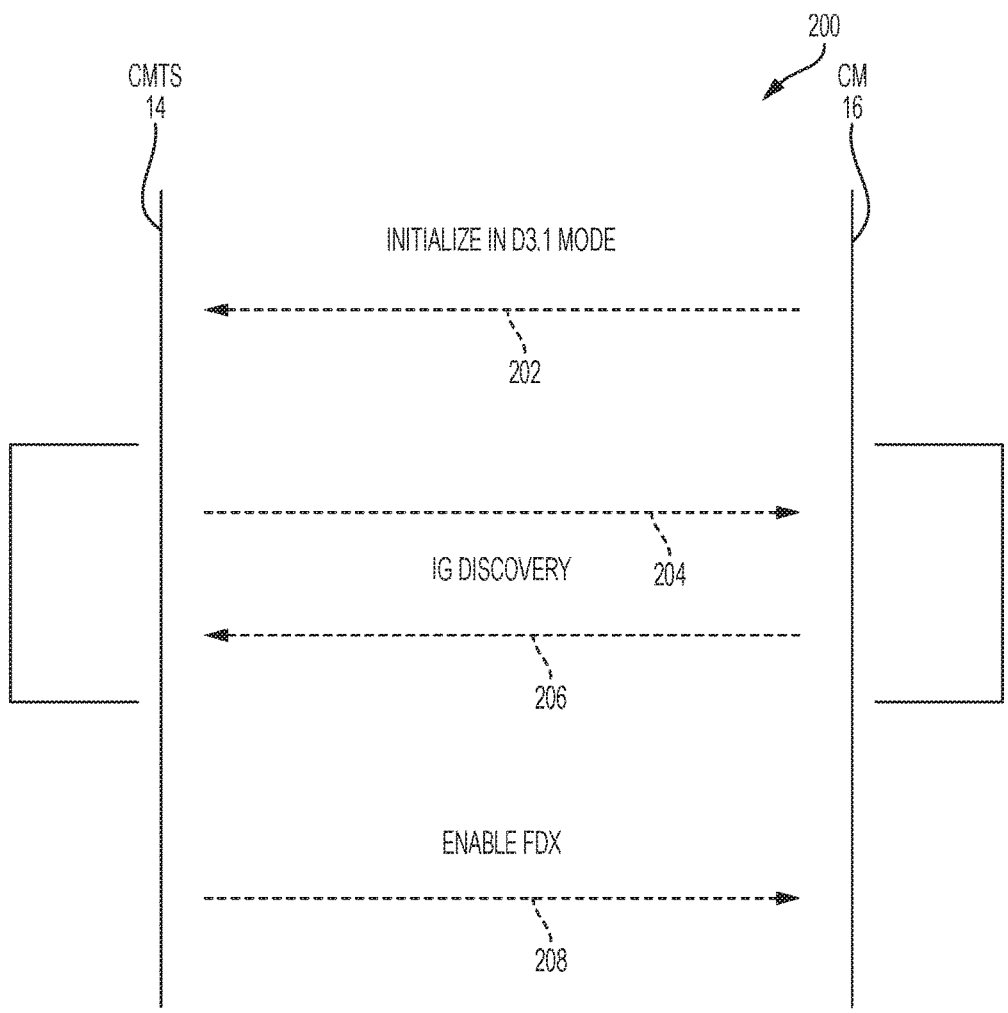
FIG. 16 is a simplified signal flow diagram illustrating example operations that may be associated with an embodiment of the communication system of FIG. 15.

Turning now to FIG. 16, FIG. 16 is a simplified signal flow diagram illustrating example operations 200 that may be associated with an embodiment of the communication system 122 of FIG. 15. FIG. 16 illustrates a simplified signal flow between CMTS 14 and a particular cable modem (CM), such as one or more of CMs 16a-16e during initialization of the CM. In 202, CM 16 initializes into an FDX discovery mode and transmits a discovery request message to CMTS 14. In a particular embodiment, CM 16 initializes into a DOCSIS 3.1 discovery mode. In 204, CMTS 14 initiates an interference group (IG) discovery procedure with CM 16. During IG discovery, CMTS 14 determines whether CM 16 will be a test CM or a detector CM and instructs CM 16 accordingly. A test CM will transmit an upstream test signal. A detector CM will measure the signal leakage in the downstream direction due to the test signal transmitted from a test CM. If CM 16 is a test CM, CM 16 transmits a test signal in the upstream direction. If CM 16 is a detector CM, CM 16 measures the signal leakage in the downstream direction from the test signal transmitted by a test CM. In 206, CM 16 sends the measurements results to CMTS 14 if CM 16 is a detector CM. Upon receiving measurement results from one or more detector CMs, CMTS 14 determines one or more IGs and allocates each of the CMs into a particular IG. In 208, CMTS 14 enables FDX operation for CM 16. As a result CM 16 is operable in FDX mode within communication network 122.

Ideally, IG discovery should to be performed at multiple locations in the frequency spectrum to reflect frequency response variations in the coaxial network. However, a tradeoff should be considered between interference level accuracy and overall system performance, as a large number of test points will lower spectrum efficiency, cost CMTS computation resources, and add extra delay for the CM to operate in FDX mode. Typically the path loth differences is less than 3 dB between two adjacent interference test signals which are 20 MHz apart. So 4 tests points per 96 MHz should be sufficient for IG discovery in most cases.

Assuming there are N number of CMs requiring IG discovery, the total number of tests required to detect the directed interference is N+1. To detect the interference relationship for any CM pair, each CM generates the test signal in turn, while the rest of the CMs measure the received signal simultaneously. Since the measurement contains both noise and interference, an additional measurement is needed to measure the noise floor when the interference test signal is not present, in order to correctly assess the received interference level. CMTS may optionally direct multiple CMs to generate test signals simultaneously to further reduce the time required for IG discovery.

In one or more embodiments, CMTS 14 conducts IG discovery periodically to detect potential interference environment changes over time. In some embodiments, longer testing intervals may be used for reduced spectrum overhead. In various embodiments, CMTS 14 may also use periodic IG discovery updates to cycle through different frequency locations within the frequency spectrum to gradually refine the IG definition in terms of interference level across the frequency spectrum.

In accordance with various embodiments, during the IG discovery, CMTS 14 commands one CM to transmit an upstream (US) test signal at specific frequency locations in the FDX band, and instructs other CMs to do downstream (DS) measurements to detect the test signal. In various embodiments, different test options are used for IG discovery in which different choices are made in selecting the nature of the US test signal, the test spectrum, and the DS measurement procedure for each test option. In various embodiments, two main categories for US test signal generation are used including:

1. In-band signaling using US bursts such as US ranging bursts, or data burst as used in US data profile testing; and
2. Out-of-band signaling using continuous wave (CW) tones generated specifically for interference testing.

In various embodiments, options for test spectrum used for the test signal include:

1. Excluded downstream (DS) subcarriers;
2. Zero bit loaded subcarriers; and
3. Inactive downstream (DS) frames in cases of TDD FDX.

In various embodiments, options for downstream measurement include:

1. Cable modem (CM) downstream (DS) symbol capture, suitable for test signals with a short time span and no DS signal present, for example, an upstream (US) burst presented in one time frame;
2. Cable modem (CM) spectrum analysis, suitable for long-lasting test signals with no DS signal present, for example, CW tones sent on excluded DS subcarriers; and
3. Per subcarrier Receiver Modulation Error Rate (Rx-MERs), suitable for long-lasting test signals, for example continuous test data streams or CW tones that last on the order of seconds.

In accordance with various embodiments, combinations of various choices of the test signal test spectrum, and downstream measurement may be used for different IG discovery solutions that are suitable for various FDX deployment constraints including DOCSIS3.1 protocol change requirements, affordable spectrum overhead and desired IG discovery speed, and DOCSIS3.1 backward compatibility.

Figure 17:
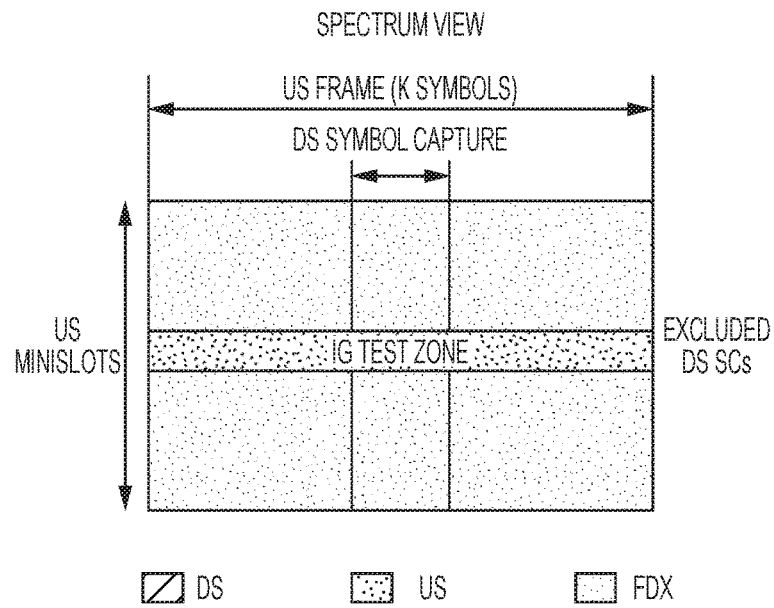
FIG. 17 is a simplified spectrum view of in-band interference group (IG) discovery using excluded downstream subcarriers (SCs) according to one embodiment.

Turning now to FIG. 17, FIG. 17 is a simplified spectrum view of in-band interference group (IG) discovery using excluded downstream subcarriers (SCs) according to one embodiment. FIG. 17 illustrates an FDX spectrum in which upstream (US) minislots are shown for the transmission of upstream test frames having a size of K symbols. As shown in FIG. 17, a group of excluded downstream (DS) subcarriers in the FDX band is allocated as an IG test zone. Excluded DS subcarriers are subcarriers of within the FDX spectrum that are not allocated for use by the CMTS or CM. In one or more embodiments, the IG test zone contains one mini-slot for the CM to send a fine ranging OFDMA burst, or a test data burst. In accordance with various embodiments, CMTS 14 schedules a test CM to send test signals within the IG test zone. One or more detector CMs perform downstream symbol capture at a predetermined time set by the CMTS in order to measure the test signal.

Figure 18:
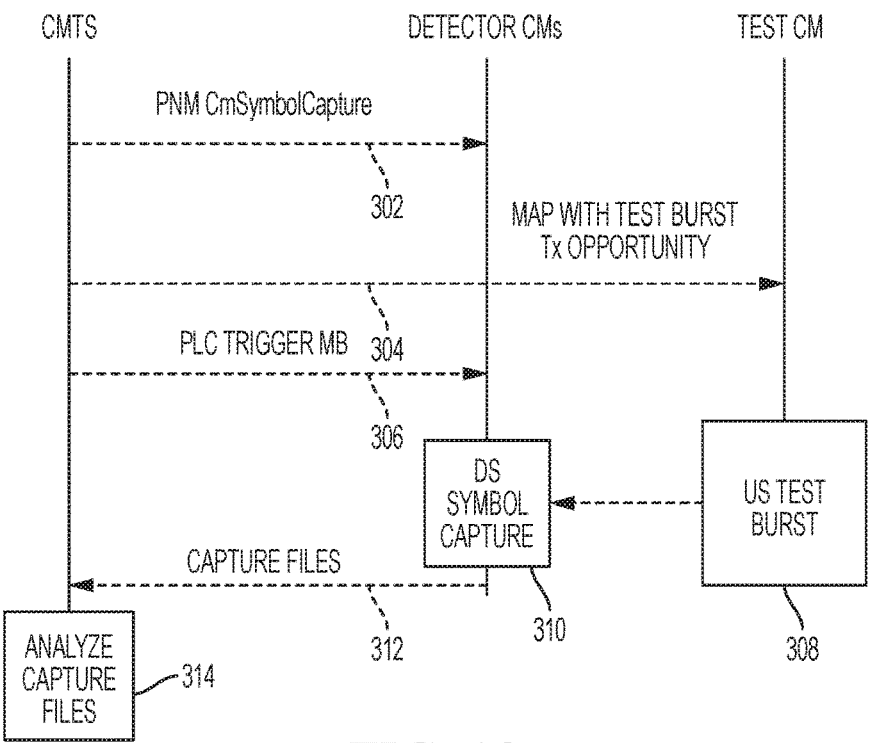
FIG. 18 is a simplified flow diagram illustrating yet other example operations that may be associated with an embodiment of the communication system of FIG. 15.

Turning now to FIG. 18, FIG. 18 is a simplified flow diagram illustrating example operations 300 that may be associated with an embodiment of the communication system 122 of FIG. 15. FIG. 18 illustrates an IG discovery procedure using excluded downstream (DS) subcarriers (SCs) according to one embodiment. In 302, CMTS 14 prepares the detector CMs to perform DS symbol capture by sending a symbol capture command, such as a DOCSIS 3.1 Proactive Network Maintenance (PNM) CMSymbolCapture command, to the detector CMs which includes a timestamp that matches a physical layer (PHY) Link Channel (PLC) timestamp message block for the detector CMs to derive a capture trigger time. In 304, CMTS 14 sends an upstream bandwidth allocation map (MAP) message to the test CM with an including an indication of a minislot in the test zone for the test CM to send an in-band test burst.

In 306, CMTS 14 sends a physical layer (PHY) Link Channel (PLC) trigger message block to each detector CM including an indication of the DS symbol capture trigger time in order to notify the detector CM of the downstream (DS) symbol capture trigger time.

In 308, the test CM sends an upstream test burst using a minislot within the excluded downstream subcarriers. In 310, the detector CMs perform downstream (DS) symbol capture at the capture trigger time indicated within the capture trigger message. In particular embodiments, the capture trigger time is set by CMTS 14 such that during the DS symbol window the full energy of the test signal can be captured by the detector CM. In 312, CMTS 14 collects capture files including the downstream (DS) symbol capture interference level data from each of the detector CMs. In particular embodiments, CMTS 14 collects capture files from the detector CMS with a PNM buck data transfer mechanism. In 314, CMTS 14 analyzes the interference level data from the capture files for IG discovery by using the interference level data to determine the IGs for communication system 122 and the grouping of the CMs within the IGs.

Figure 19:
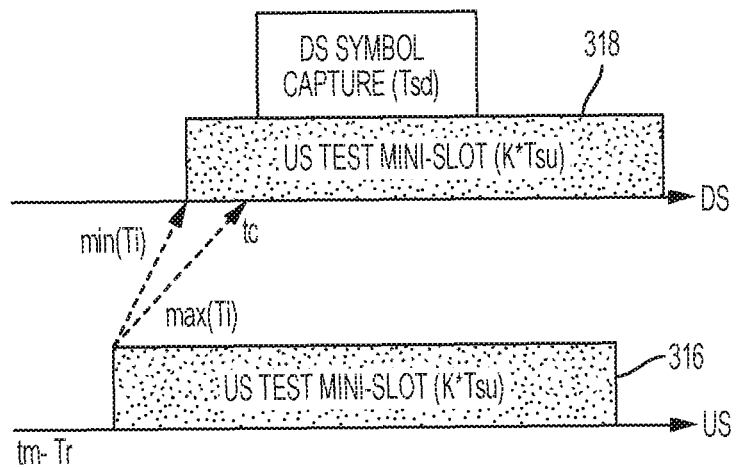
FIG. 19 is an example timing diagram for determining of an in-band IG discovery capture trigger time according to one embodiment.

Turning now to FIG. 19, FIG. 19 is an example timing diagram for determining of an in-band IG discovery capture trigger time according to one embodiment. FIG. 19 shows a upstream (US) test mini-slot 316 transmitted by a test CM and a corresponding downstream (DS) symbol capture 318 of the interference due to the test minislot by a detector CM. In accordance with one or more embodiments, the capture trigger time t, is set based on the following analysis.

The test signal is guaranteed under the following condition:

$$K^*T_{su} - T_{sd} \geq T_{rmax}$$

$$t_c = t_m + T_{rmax}$$

The above conditions ensure the following:

$$t_c + T_{sd} \leq t_m - T_r + \min(T_i) + K^*T_{su}$$

$$t_c \geq t_m - T_r + \max(T_i)$$

where

K: Number of symbols per minislot $t_m$: US test burst start time in MAP
$T_{su}$: US Symbol size $t_c$: DS symbol capture trigger time in PLC
$T_{sd}$: DS Symbol size CM-to-CM interference delay
$T_r$: Test CM's ranging time offset $T_{rmax}$: Timing offset of the furthest CM In various embodiments, this option is fully supported by DOCSIS3.1 with no protocol change required, however with relatively high spectrum overhead as excluded DS SCs.

Figure 20:
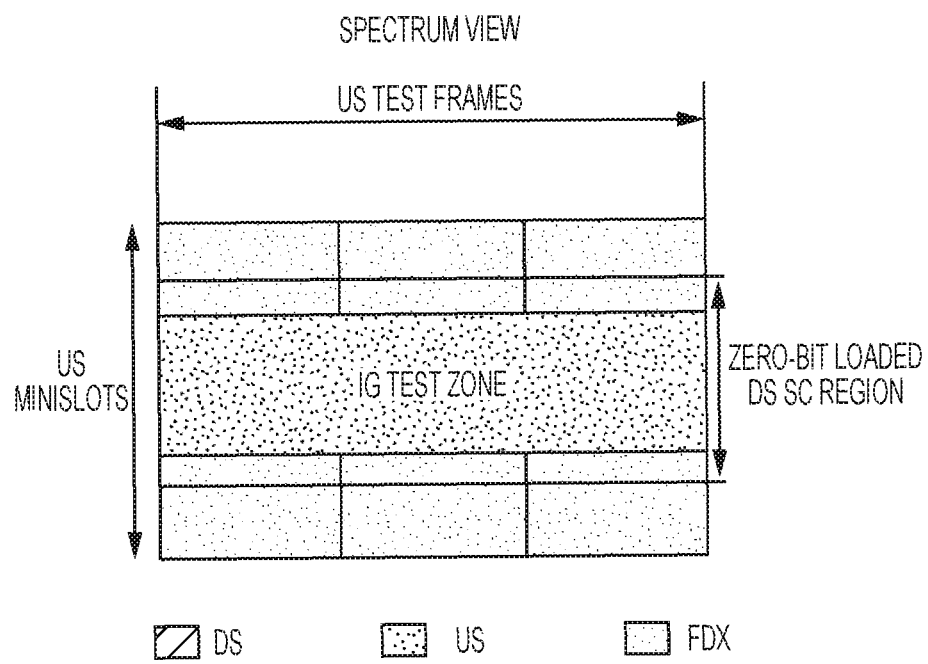
FIG. 20 is a simplified spectrum view of in-band interference group (IG) discovery using zero-bit loaded downstream subcarriers (SCs) according to one embodiment.

Turning now to FIG. 20, FIG. 20 is a simplified spectrum view of in-band interference group (IG) discovery using zero-bit loaded downstream subcarriers (SCs) according to one embodiment. FIG. 20 illustrates an FDX spectrum in which upstream (US) minislots are shown for the transmission of upstream test frames. As shown in FIG. 20, a zero-bit loaded downstream (DS) subcarrier region in the FDX band is mapped as an IG test zone. Zero-bit loaded SCs are modulated in binary phase-shift keying (BPSK) without carrying any data information. Accordingly, it is safe to overlay this region with a upstream (US) test signal transmitted by a test CM. Detector CMs rely on CM RxMER to detect the presence of interference in the downstream. Since the zero-bit load SCs are not permanent and are configurable using a DS profile change procedure, a wide IG test zone can be used to allow multiple CMs to be tested simultaneously.

Figure 21:
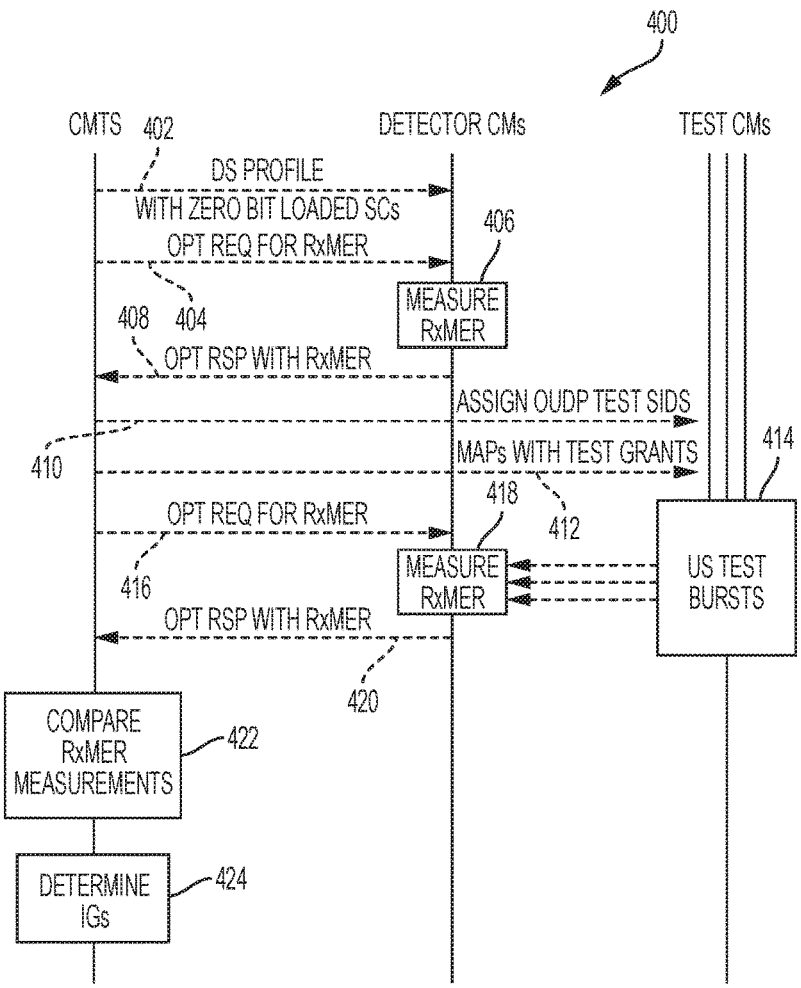
FIG. 21 is a simplified flow diagram illustrating yet other example operations that may be associated with an embodiment of the communication system of FIG. 15.

Turning now to FIG. 21, FIG. 21 is a simplified flow diagram illustrating example operations 400 that may be associated with an embodiment of the communication system 122 of FIG. 15. FIG. 21 illustrates an IG discovery procedure using zero-bit loaded downstream subcarriers (SCs) according to one embodiment. In 402, CMTS 14 adds zero-bit loaded SCs to all downstream (DS) data profiles and sends the DS profile with the zero-bit loaded SCs to one or more detector CMs. In 404, CMTS 14 sends an OFDM profile test (OPT) request to the detector CMs to instruct the detector CMs to measure and report RxMER. In particular embodiments, the detector CMs measure and report RxMER using a DOCSIS3.1 DS OFDM profile test (OPT) procedure. In 406, each of the detector CMs measure the RxMER. In 408, each of the detector CMs sends an OPT response message including the measured RxMER to CMTS 14.

In 410, CMTS assigns test service IDs (SIDs) to one or more test CMs by sending a message including the assigned test SIDs to the test CMs. In particular embodiments, the message including the assigned test SIDs is a DBC message. In 412, CMTS 14 sends MAP messages (MAPS) including test signal grants in the IG test zone to the test CMs for the test CMs to transmit a continuous test data stream such as used in DOCSIS3.1 US data profile test procedure. In 414, the test CMs transmit upstream (US) test streams or test bursts within the IG test zone of the zero-bit loaded DS SC region. In 416, CMTS 14 sends an OPT request message to the detector CMs to command the detector CMs to report RxMERs while the test data streams are being sent by the test CMs. In 418, the detector CMs measure the RxMER. In 420, the detector CMs send an OPT response message to CMTS 14 to report the measured RxMER.

In 422, CMTS 14 compares the set of RxMER measurements obtained prior to the transmitting of the US test signals by the test CMs and the set of RxMER measurements obtained during transmitting of the US test signals by the test CMs to identify potential interferences for IG discovery. In 424, CMTS 14 determines the IGs for communication system 122 and the grouping of the CMs within the IGs based upon the comparison. If all IG discovery tests are done, CMTS 14 updates the DS profiles to restore the normal bit loading at the zero-bit loaded subcarriers.

In various embodiments, this option is fully supported by DOCSIS 3.1 with no protocol change required, however with relatively high spectrum overhead as the RxMER measurement requires the test signals to last for on the order of seconds. In order to reduce the IG discovery time, a large number of SCs may be required to be reserved during the tests.

Figure 22:
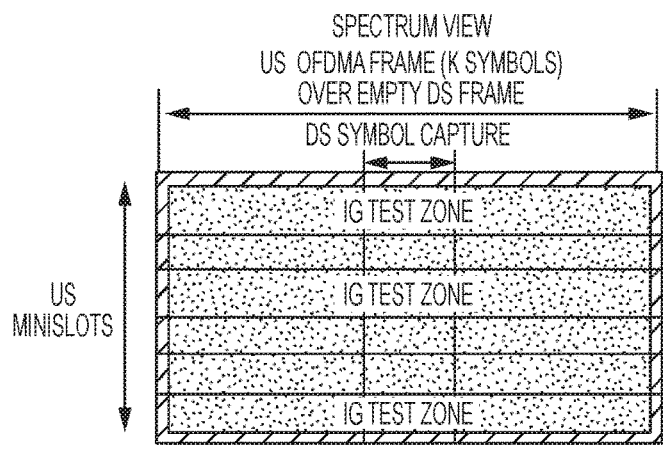
FIG. 22 is a simplified spectrum view of in-band interference group (IG) discovery using inactive downstream frames according to one embodiment.

Turning now to FIG. 22, FIG. 22 is a simplified spectrum view of in-band interference group (IG) discovery using inactive downstream frames according to one embodiment. FIG. 22 illustrates an FDX spectrum in which upstream (US) minislots are shown for the transmission of upstream test frames and in which the entire spectrum is available for the IG test zone and the US test frames are OFDMA frames of K symbol length sent over empty DS frames. In a TDD-FDX system, DS transmission is framed in a similar manner as the US framing structure. For IG discovery purposes, the US test bursts can be sent during an inactive DS frame, during which no DS transmission is allowed. Since the entire spectrum is available for the IG tests, multiple interference tests can be performed simultaneously.

Figure 23:
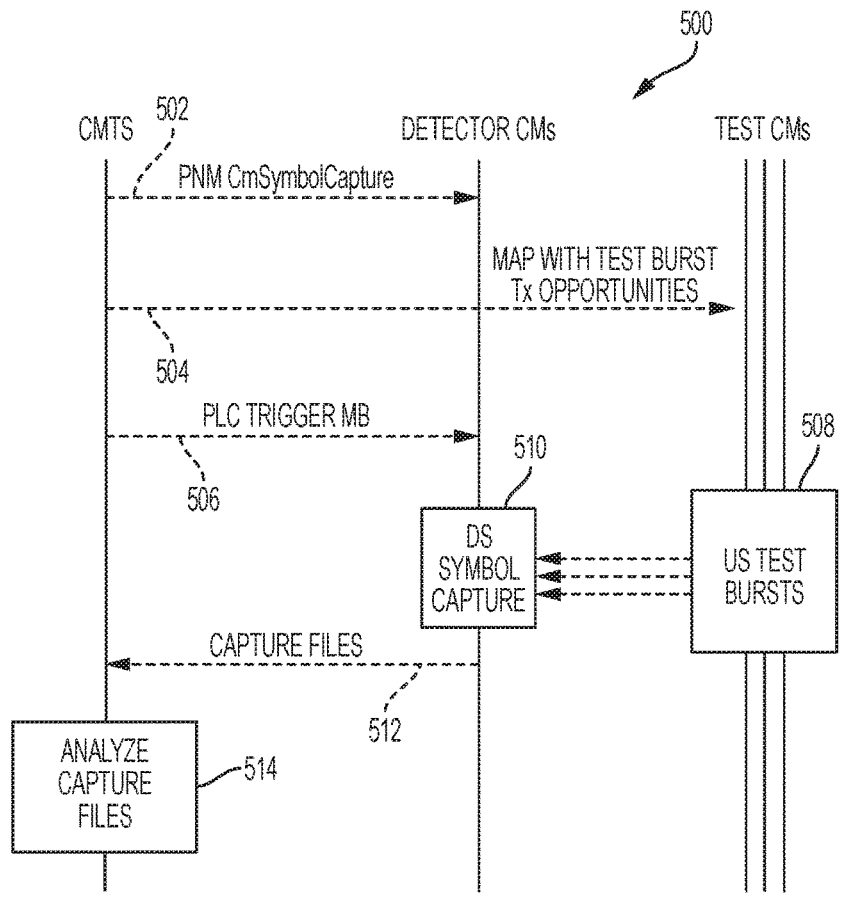
FIG. 23 is a simplified flow diagram illustrating yet other example operations that may be associated with an embodiment of the communication system of FIG. 15.

Turning now to FIG. 23, FIG. 23 is a simplified flow diagram illustrating example operations 500 that may be associated with an embodiment of the communication system 122 of FIG. 15. FIG. 23 illustrates an IG discovery procedure using inactive downstream frame according to one embodiment. In 502, CMTS 14 prepares the detector CMs to perform DS symbol capture by sending a symbol capture command, such as a DOCSIS 3.1 Proactive Network Maintenance (PNM) CMSymbolCapture command, to the detector CMs which includes a timestamp that matches a physical layer (PHY) Link Channel (PLC) timestamp message block for the detector CMs to derive a capture trigger time. In 504, CMTS 14 sends an upstream bandwidth allocation map (MAP) message to the test CMs including an indication of a minislot in the test zone for the test CM to send an in-band test burst.

In 506, CMTS 14 sends a physical layer (PHY) Link Channel (PLC) trigger message block to each detector CM including an indication of the DS symbol capture trigger time in order to notify the detector CM of the downstream (DS) symbol capture trigger time.

In 508, the test CMs send an upstream test burst using a minislot within an inactive downstream frame. In 510, the detector CMs perform downstream (DS) symbol capture at the capture trigger time indicated within the capture trigger message. In particular embodiments, the capture trigger time is set by CMTS 14 such that during the DS symbol window the full energy of the test signal can be captured by the detector CM. In 512, CMTS 14 collects capture files including the downstream (DS) symbol capture interference level data from each of the detector CMs. In particular embodiments, CMTS 14 collects capture files from the detector CMS with a PNM buck data transfer mechanism. In 514, CMTS 14 analyzes the interference level data from the capture files for IG discovery by using the interference level data to determine the IGs for communication system 122 and the grouping of the CMs within the IGs.

In particular embodiments, this option uses the least spectrum overhead, as one test frame may provide multiple IG test zones, and only last one OFDMA frame. However, particular embodiments require TDD FDX support to carry the test zones within an inactive DS frame. In particular embodiments, the measurement option may be supported by DOCSIS 3.1 CMs if the DOCSIS 3.1 CM can receive TDD DS signals.

Figure 24:
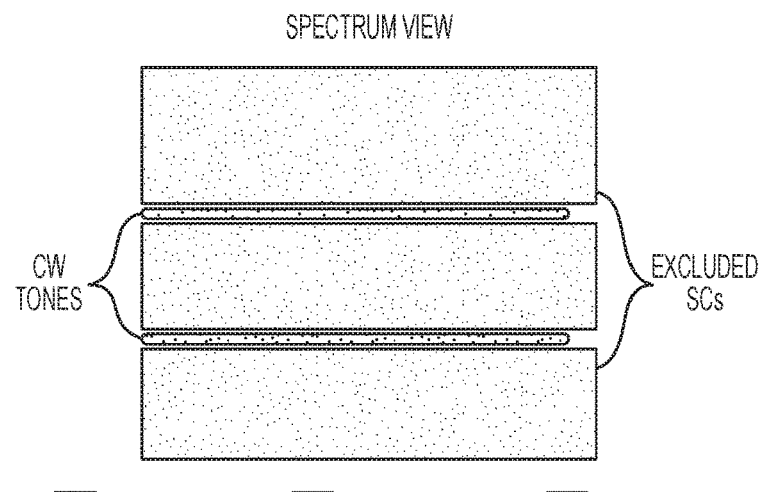
FIG. 24 is a simplified spectrum view of out-of-band interference group (IG) discovery using excluded subcarriers according to one embodiment.

Turning now to FIG. 24, FIG. 24 is a simplified spectrum view of out-of-band interference group (IG) discovery using excluded subcarriers according to one embodiment. One way to reduce the spectrum overhead is to use a continuous wave (CW) tone as a test signal instead of using a regular US minislot, which may occupy, for example, 8 or 16 subcarriers over 400 KHz. FIG. 24 illustrates an FDX spectrum in which CW tones are applied using excluded subcarriers (SCs) for use as out-of-band test tones for IG discovery. It should be noted that in some embodiments, the CW tone may have power leakage to adjacent SCs to force lower bit loading on the adjacent subcarriers.

Figure 25:
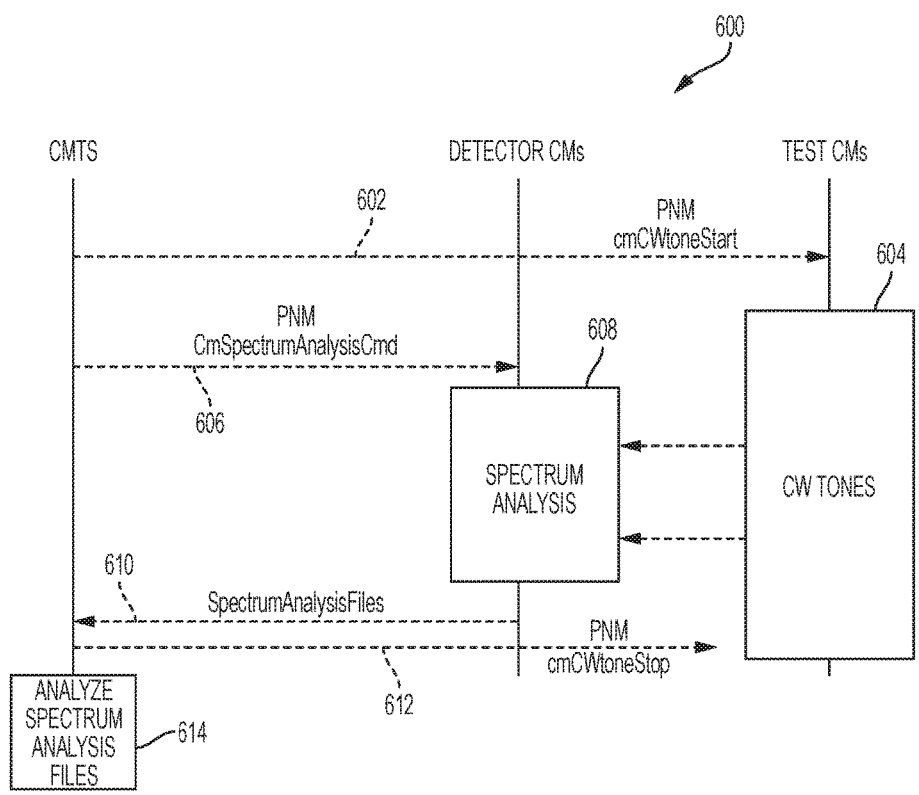
FIG. 25 is a simplified flow diagram illustrating yet other example operations that may be associated with an embodiment of the communication system of FIG. 15.

Turning now to FIG. 25, FIG. 25 is a simplified flow diagram illustrating example operations 600 that may be associated with an embodiment of the communication system 122 of FIG. 15. FIG. 25 illustrates an IG discovery procedure using out-of-band continuous wave (CW) tones over excluded subcarriers according to one embodiment. In 602, CMTS 14 instructs one or more test CMs to start CW tone generation by sending a CW tone start request message, such as a PNM cmCWtoneStart message, to the test CMs. In 604, the test CMs generate out-of-band CW tones over the excluded subcarrier (SC) portion of the FDX spectrum. In 606, CMTS 14 instructs one or more detector CMs to perform spectrum analysis of the CW tones transmitted by the test CMs by sending a spectrum analysis request to the detector CMs. In particular embodiments, CMTS 14 sends a DOCSIS 3.1 PNM cmSpectrumAnalysisCmd message to the detector CMs. In 608, the detector CMs perform downstream spectrum analysis upon the CW tones transmitted by the test CMs mechanism to determine the energy content of the signal in order to identify interference. In a particular embodiment, CMTS 14 performs spectrum analysis using a DOCSIS 3.1 PNM cmSpectrumAnalysis mechanism.

In 610, CMTS 14 collects the spectrum analysis result files from the detector CMs. In particular embodiments, CMTS 14 collects the spectrum analysis result files using a PNM bulk data transfer mechanism. In 612, CMTS 14 instructs the test CMs to stop CW tone generation by sending a CW tone stop request message, such as a PNM cmCWtoneStop message, to the test CMs. In 614, CMTS 14 analyses the collected spectrum analysis result files to identify the interference relationship between the CMs through spectrum matching to determine the IGs for communication system 122 and the grouping of the CMs within the IGs.

Figure 26:
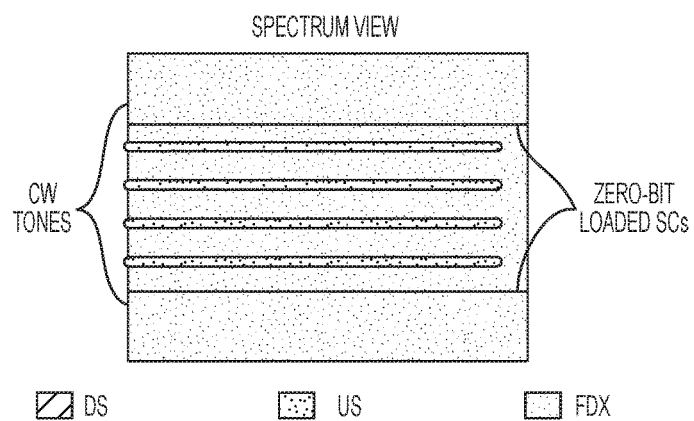
FIG. 26 is a simplified spectrum view of out-of-band interference group (IG) discovery using zero-bit loaded subcarriers according to one embodiment.

Turning now to FIG. 26, FIG. 26 is a simplified spectrum view of out-of-band interference group (IG) discovery using zero-bit loaded subcarriers according to one embodiment. FIG. 26 illustrates an FDX spectrum in which CW tones are sent over upstream zero-bit loaded subcarriers. CMTS 14 relies on RxMERs measured on the downstream by detector CMs to detect the presence of interference. Since the zero-bit load SCs are not permanent and configurable using a DS profile change procedure, a wide IG test zone can be used to allow multiple CMs to be tested simultaneously.

Figure 27:
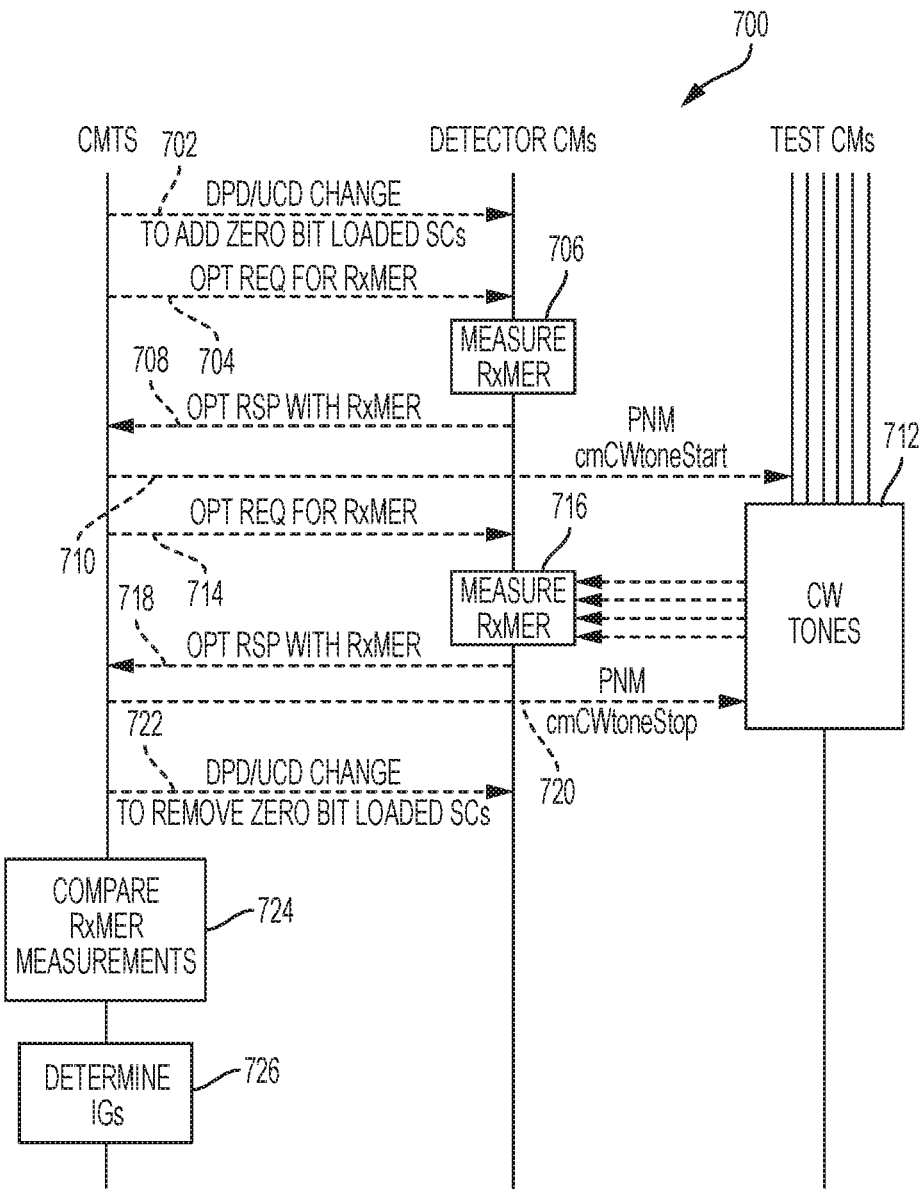
FIG. 27 is a simplified flow diagram illustrating yet other example operations that may be associated with an embodiment of the communication system of FIG. 15.

Turning now to FIG. 27, FIG. 27 is a simplified flow diagram illustrating example operations 700 that may be associated with an embodiment of the communication system 122 of FIG. 15. FIG. 27 illustrates an IG discovery procedure using out-of-band using CW tones over zero-bit loaded subcarriers according to one embodiment. In 702, CMTS 14 adds zero bit loaded SCs to all DS data profiles and all US profiles by sending a profile change message to one or more detector CMs. In particular embodiments, CMTS 14 utilizes a DOCSIS3.1 profile change procedure by sending an downstream profile descriptor (DPD)/upstream channel descriptor (UCD) change message with an indication to add zero-bit loaded SCs to the downstream and upstream profiles. In 704, CMTS 14 sends an OFDM profile test (OPT) request to the detector CMs to instruct the detector CMs to measure and report RxMER. In particular embodiments, the detector CMs measure and report RxMER using a DOCSIS3.1 DS OFDM profile test (OPT) procedure. In 706, each of the detector CMs measure the RxMER as a baseline measurement. In 708, each of the detector CMs sends an OPT response message including the measured baseline RxMER to CMTS 14.

In 710, CMTS 14 instructs one or more test CMs to start CW tone generation by sending a CW tone start request message, such as a PNM cmCWtoneStart message, to the test CMs. In 712, the test CMs generate upstream out-of-band CW tones over zero-bit loaded subcarriers. In 714, CMTS 14 sends an OPT request message to the detector CMs to command the detector CMs to report RxMERs while the CW tones are being sent by the test CMs. In 716, the detector CMs measure the RxMER while the CW tones are being sent by the test CMs. In 718, the detector CMs send an OPT response message to CMTS 14 to report the measured RxMER values. In 720, CMTS 14 instructs the test CMs to stop CW tone generation by sending a CW tone stop request message, such as a PNM cmCWtoneStop message, to the test CMs. Once all IG discovery tests are done, in 722 CMTS 14 updates the DS and US profiles to restore the normal bit loading at the zero-bit loaded subcarriers.

In 724, CMTS 14 compares the set of baseline RxMER measurements obtained prior to the transmitting of the CW tones by the test CMs and the set of RxMER measurements obtained during transmitting of the CW tones by the test CMs to identify potential interferences for IG discovery. In 726, CMTS 14 determines the IGs for communication system 122 and the grouping of the CMs within the IGs based upon the comparison.

In one or more embodiments, out-of-band IG discovery using excluded subcarriers and out-of-band IG discovery using zero-bit loaded subcarriers can be combined to improve IG discovery efficiency. For example, out-of-band IG discovery using zero-bit loaded subcarriers can be used for IG discovery at system initialization time when a large number of CMs require IG discovery, and out-of-band IG discovery using excluded subcarriers can be used for IG discovery for a single CM online or used for periodic IG updates.

Figure 28:
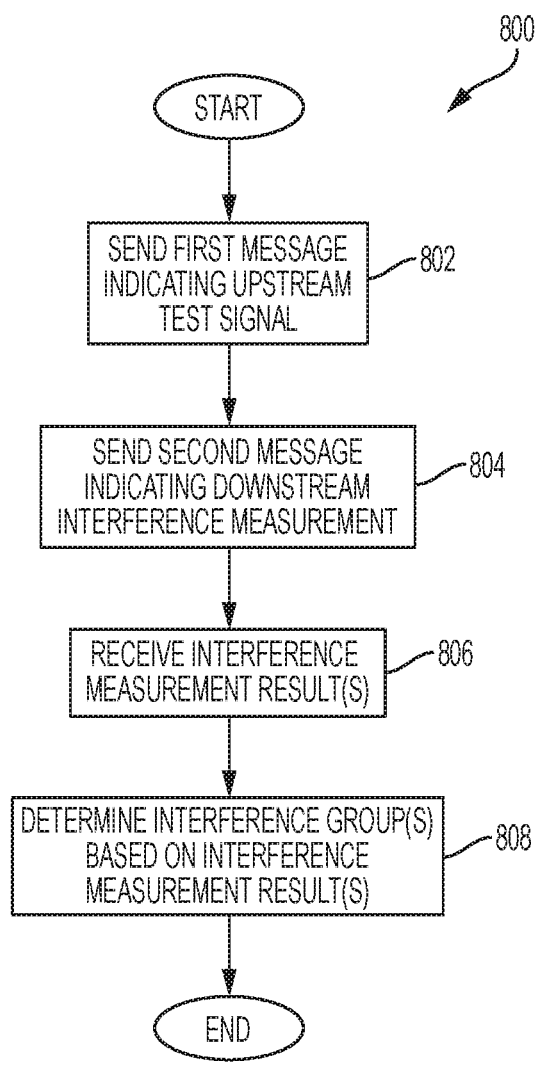
FIG. 28 is a simplified flow diagram illustrating example operations that may be associated with an embodiment of communication system of FIG. 15.

Turning now to FIG. 28, FIG. 28 is a simplified flow diagram illustrating example operations 800 that may be associated with an embodiment of communication system 122 of FIG. 15. FIG. 28 shows example operations for interference group discovery for a full duplex network architecture in a cable network environment.

In 802, CMTS 14 sends a first message to at least a first cable modem of a plurality of cable modems. The first message indicates an upstream test signal to be generated by the first cable modem within a predetermined portion of a frequency spectrum allocated for downstream communication. In at least one embodiment, the upstream test signal is an in-band signal. In particular embodiments, the in-band signal is a test burst signal. In at least one embodiment, the predetermined portion of the frequency spectrum includes a portion of the frequency spectrum allocated to excluded downstream subcarriers. In still other embodiments, the predetermined portion of the frequency spectrum includes a portion of the frequency spectrum allocated to zero-bit loaded downstream subcarriers. In still other embodiments, the predetermined portion of the frequency spectrum includes a portion of the frequency spectrum allocated to inactive downstream frames.

In other embodiments, the upstream test signal is an out-of-band signal. In particular embodiments, the out-of-band signal includes a continuous wave tone. In at least one embodiment, the predetermined portion of the frequency spectrum includes a portion of the frequency spectrum allocated to excluded subcarriers. In still other embodiments, the predetermined portion of the frequency spectrum includes a portion of the frequency spectrum allocated to zero-bit loaded subcarriers.

In 804, CMTS 14 sends a second message to at least a second cable modem of the plurality of cable modems. The second message indicates a downstream interference measurement to be performed on the upstream test signal by the second cable modem. In at least one particular embodiment, the downstream interference measurement includes performing a downstream symbol capture on the upstream test signal by the second cable modem. In at least another particular embodiment, the downstream interference measurement includes measuring a Receiver Modulation Error Rate (RxMER) of the upstream test signal by the second cable modem. In at least another particular embodiment, the downstream interference measurement includes performing a perform downstream spectrum analysis on the upstream test signal by the second cable modem.

In 806, CMTS 14 receives at least one interference measurement result indicative of the downstream interference measurement. In a particular embodiment, the at least one interference measurement result includes at least one downstream symbol capture file. In another particular embodiment, the at least one interference measurement result includes RxMER measurement results. In still another particular embodiment, the at least one interference measurement result includes at least one spectrum analysis file.

In 808, CMTS 14 determines at least one interference group for the plurality of cable modems based upon the at least one interference measurement result. In one or more embodiments, CMTS 14 determines one or more IGs and allocates each of the CMs into a particular IG based upon the interference measurement results. The IG discovery procedure then ends.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, CMTS 14, MAC scheduler 26, amplifier 20, transceiver 18, and CMs 16a-16e. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, CMTS 14, MAC scheduler 26, amplifier 20, transceiver 18, and CMs 16a-16e described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 27, DSP 170, DSP 228) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication systems 10 and 122 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication systems 10 and 122 may be applicable to other exchanges or routing protocols. Moreover, although communication systems 10 and 122 have been illustrated with reference to particular elements and operations that facilitate the communication process, these elements, and operations may be replaced by any suitable architecture or process that achieves the intended functionality of communication systems 10 and 122.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus in a cable network, comprising:
    a processor; and
    a memory element in communication with the processor, the processor configured to:
        send a first message to at least a first cable modem of a plurality of cable modems, the first message indicating an upstream test signal to be generated by the first cable modem within a predetermined portion of a frequency spectrum allocated for downstream communication wherein the predetermined portion of the frequency spectrum includes a portion of the frequency spectrum allocated to inactive downstream frames;
        send a second message to at least a second cable modem of the plurality of cable modems, the second message indicating a downstream interference measurement to be performed on the upstream test signal by the second cable modem;
        receive at least one interference measurement result indicative of the downstream interference measurement; and
        determine at least one interference group for the plurality of cable modems based upon the at least one interference measurement result.

2. The apparatus of claim 1, wherein the upstream test signal is an in-band signal.

3. The apparatus of claim 2, wherein the in-band signal is a test burst signal.

4. The apparatus of claim 2, wherein the predetermined portion of the frequency spectrum includes a portion of the frequency spectrum allocated for excluded downstream subcarriers.

5. The apparatus of claim 2, wherein the predetermined portion of the frequency spectrum includes a portion of the frequency spectrum allocated to zero-bit loaded downstream subcarriers.

6. The apparatus of claim 1, wherein the upstream test signal is an out-of-band signal.

7. The apparatus of claim 6, wherein the out-of-band signal includes a continuous wave tone.

8. The apparatus of claim 6, wherein the predetermined portion of the frequency spectrum includes a portion of the frequency spectrum allocated to excluded subcarriers.

9. The apparatus of claim 6, wherein the predetermined portion of the frequency spectrum includes a portion of the frequency spectrum allocated to zero-bit loaded subcarriers.

10. The apparatus of claim 1, wherein the downstream interference measurement includes performing a downstream symbol capture on the upstream test signal by the second cable modem.

11. The apparatus of claim 1, wherein the downstream interference measurement includes measuring a Receiver Modulation Error Rate (RxMER) of the upstream test signal by the second cable modem.

12. The apparatus of claim 1, wherein the downstream interference measurement includes performing a perform downstream spectrum analysis on the upstream test signal by the second cable modem.

13. The apparatus of claim 1, wherein the apparatus includes a cable modem termination system (CMTS).

14. A method, comprising:
    sending a first message to at least a first cable modem of a plurality of cable modems, the first message indicating an upstream test signal to be generated by the first cable modem within a predetermined portion of a frequency spectrum allocated for downstream communication wherein the predetermined portion of the frequency spectrum includes a portion of the frequency spectrum allocated to inactive downstream frames;
    sending a second message to at least a second cable modem of the plurality of cable modems, the second message indicating a downstream interference measurement to be performed on the upstream test signal by the second cable modem;
    receiving at least one interference measurement result indicative of the downstream interference measurement; and
    determining at least one interference group for the plurality of cable modems based upon the at least one interference measurement result.

15. The method of claim 14, wherein the predetermined portion of the frequency spectrum includes a portion of the frequency spectrum allocated to excluded subcarriers.

16. The method of claim 14, wherein the predetermined portion of the frequency spectrum includes a portion of the frequency spectrum allocated to zero-bit loaded subcarriers.

17. The method of claim 14, wherein the downstream interference measurement includes performing a downstream symbol capture on the upstream test signal by the second cable modem.

18. The method of claim 14, wherein the downstream interference measurement includes measuring a Receiver Modulation Error Rate (RxMER) of the upstream test signal by the second cable modem.

19. The method of claim 14, wherein the downstream interference measurement includes performing a perform downstream spectrum analysis on the upstream test signal by the second cable modem.

20. Non-transitory tangible computer-readable media that includes instructions for execution, which when executed by a processor, is operable to perform operations comprising:
sending a first message to at least a first cable modem of a plurality of cable modems, the first message indicating an upstream test signal to be generated by the first cable modem within a predetermined portion of a frequency spectrum allocated for downstream communication wherein the predetermined portion of the frequency spectrum includes a portion of the frequency spectrum allocated to inactive downstream frames;
sending a second message to at least a second cable modem of the plurality of cable modems, the second message indicating a downstream interference measurement to be performed on the upstream test signal by the second cable modem;
receiving at least one interference measurement result indicative of the downstream interference measurement; and
determining at least one interference group for the plurality of cable modems based upon the at least one interference measurement result.

21. The media of claim 20, wherein the downstream interference measurement includes performing a downstream symbol capture on the upstream test signal by the second cable modem.

22. The media of claim 20, wherein the downstream interference measurement includes measuring a Receiver Modulation Error Rate (RxMER) of the upstream test signal by the second cable modem.

23. The media of claim 20, wherein the downstream interference measurement includes performing a perform downstream spectrum analysis on the upstream test signal by the second cable modem.

* * * * *